United States Patent
Wang et al.

(10) Patent No.: US 12,443,443 B2
(45) Date of Patent: Oct. 14, 2025

(54) WORKLOAD SCHEDULER FOR MEMORY ALLOCATION

(71) Applicant: SK Hynix NAND Product Solutions Corp., Rancho Cordova, CA (US)

(72) Inventors: Yipeng Wang, Portland, OR (US); Ren Wang, Portland, OR (US); Tsung-Yuan C. Tai, Portland, OR (US); Yifan Yuan, Champaign, IL (US); Pravin Pathak, Bridgewater, NJ (US); Sundar Vedantham, Allentown, PA (US); Chris MacNamara, Limerick (IE)

(73) Assignee: SK Hynix NAND Product Solutions Corp., Rancho Cordova, CA (US)

( * ) Notice: Subject to any disclaimer, the term of this patent is extended or adjusted under 35 U.S.C. 154(b) by 888 days.

(21) Appl. No.: 16/799,745

(22) Filed: Feb. 24, 2020

(65) Prior Publication Data
US 2020/0192715 A1    Jun. 18, 2020

(51) Int. Cl.
*G06F 9/50* (2006.01)
*G06F 12/02* (2006.01)
*G06F 12/0862* (2016.01)

(52) U.S. Cl.
CPC .......... *G06F 9/5016* (2013.01); *G06F 12/023* (2013.01); *G06F 12/0253* (2013.01); *G06F 12/0862* (2013.01); *G06F 2212/1044* (2013.01); *G06F 2212/602* (2013.01)

(58) Field of Classification Search
CPC .............. G06F 12/023; G06F 12/0253; G06F 12/0862; G06F 2212/1044; G06F 2212/602

USPC ........................................................ 711/119
See application file for complete search history.

(56) References Cited

U.S. PATENT DOCUMENTS

| 10,951,525 B2 | 3/2021 | Vasudevan |
| 11,573,816 B1* | 2/2023 | Featonby ................ H04L 67/10 |
| 2003/0163608 A1* | 8/2003 | Tiwary ................ G06F 11/3414 |
| | | 714/E11.193 |
| 2008/0188209 A1* | 8/2008 | Dorogusker ........... H04H 60/64 |
| | | 455/414.2 |

(Continued)

OTHER PUBLICATIONS

Berger, Emery, D., et. al., "Hoard: A Scalable Memory Allocator for Multithreaded Applications", Copyright 2000 ACM, 12 pages.

(Continued)

*Primary Examiner* — Arpan P. Savla
*Assistant Examiner* — Sidney Li
(74) *Attorney, Agent, or Firm* — Haley Guiliano LLP

(57) ABSTRACT

Examples described herein relate to a work scheduler that includes at least one processor and at least one queue. In some examples, the work scheduler receives a request to allocate a region of memory and based on availability of a memory segment associated with a central cache to satisfy the request to allocate a region of memory, provide a memory allocation using an available memory segment entry associated with the central cache from the at least one queue. In some examples, the work scheduler assigns a workload to a processor and controls when to pre-fetch content relevant to the workload to store in a cache or memory accessible to the processor based on a position of the workload in a work queue associated with the processor.

14 Claims, 14 Drawing Sheets

(56) References Cited

U.S. PATENT DOCUMENTS

| | | | |
|---|---|---|---|
| 2008/0222343 A1* | 9/2008 | Veazey | G06F 12/0862 |
| | | | 711/3 |
| 2011/0072218 A1* | 3/2011 | Manne | G06F 12/123 |
| | | | 711/E12.001 |
| 2013/0268700 A1* | 10/2013 | Fuhs | G06F 13/28 |
| | | | 710/22 |
| 2013/0326113 A1* | 12/2013 | Wakrat | G06F 12/0868 |
| | | | 711/E12.008 |
| 2014/0164711 A1* | 6/2014 | Loh | G06F 12/0862 |
| | | | 711/136 |
| 2015/0081726 A1* | 3/2015 | Izenberg | G06F 16/00 |
| | | | 707/755 |
| 2017/0286337 A1 | 10/2017 | Wang et al. | |
| 2018/0335824 A1* | 11/2018 | MacNamara | G06F 1/266 |
| 2019/0116127 A1* | 4/2019 | Pismenny | H04L 63/0272 |
| 2019/0121781 A1* | 4/2019 | Kasichainula | G06F 15/17331 |
| 2019/0243685 A1 | 8/2019 | Bernat et al. | |
| 2019/0253357 A1 | 8/2019 | Pathak et al. | |
| 2019/0317802 A1 | 10/2019 | Bachmutsky et al. | |

OTHER PUBLICATIONS

Evans, Jason, "A Scalable Concurrent malloc(3) Implementation for FreeBSD", Apr. 16, 2006, 14 pages.

Ghemawat, Sanjay, et.al., "TCMalloc : Thread-Caching Malloc", http://goog-perftools.sourceforge.net/doc/tcmalloc.html, downloaded from the Internet Jul. 8, 2022, 5 pages.

Kanev, Svilen, et. al., "Profiling a warehouse-scale computer", ISCA'15, Jun. 13-17, 2015, Portland, OR USA, 12 pages.

Kennelly, Chris, "Announcing TCMalloc", Abseil Blog, https://abseil.io/blog/20200212-tcmalloc, Feb. 12, 2020, 5 pages.

Maas, Martin, et. al., "A Hardware Accelerator for Tracing Garbage Collection", Appears in the Proceedings of the 45th ACM/IEEE International Symposium on Computer Architecture 2018 IEEE, 14 pages.

\* cited by examiner

WORKLOAD SCHEDULER FOR MEMORY ALLOCATION

Communication between cores in a multi-core processor is an important feature in many computer applications such as packet processing, high-performance computing (HPC), and machine learning. The number of cores that can communicate may be limited if adequate inter-core communication is not available. Shared memory space managed by software is often employed to realize inter-core communication. Moreover, a large amount of data can move between memory domains of processors for processing. In some scenarios, offload engines are available to perform certain tasks for central processing units (CPUs) in order to free the CPU to perform other operations.

DETAILED DESCRIPTION

Memory management, such as memory allocation and de-allocation, utilize a substantial amount of total execution time and resources in cloud computing systems such as servers and data centers. Cloud service providers (CSPs) desire to reduce resource use for memory management in their data centers. TCMalloc provides a manner of memory management whereby free memory objects are cached per-thread and using a central table. Although the per-thread cache allocates memory relatively quickly, allocating memory objects from the central table could cost thousands to tens of thousands of CPU cycles. Accessing the central table or even a page heap contributes to latency and jitter (e.g., unpredictable completion time) of memory allocation requests sent to a server. Other software implementations of memory allocation can be used such as glibc's malloc implementation, jemalloc, hoard, and so forth. However, even if with the most efficient software implementations, memory allocation still costs many CPU cycles.

Figure 1:
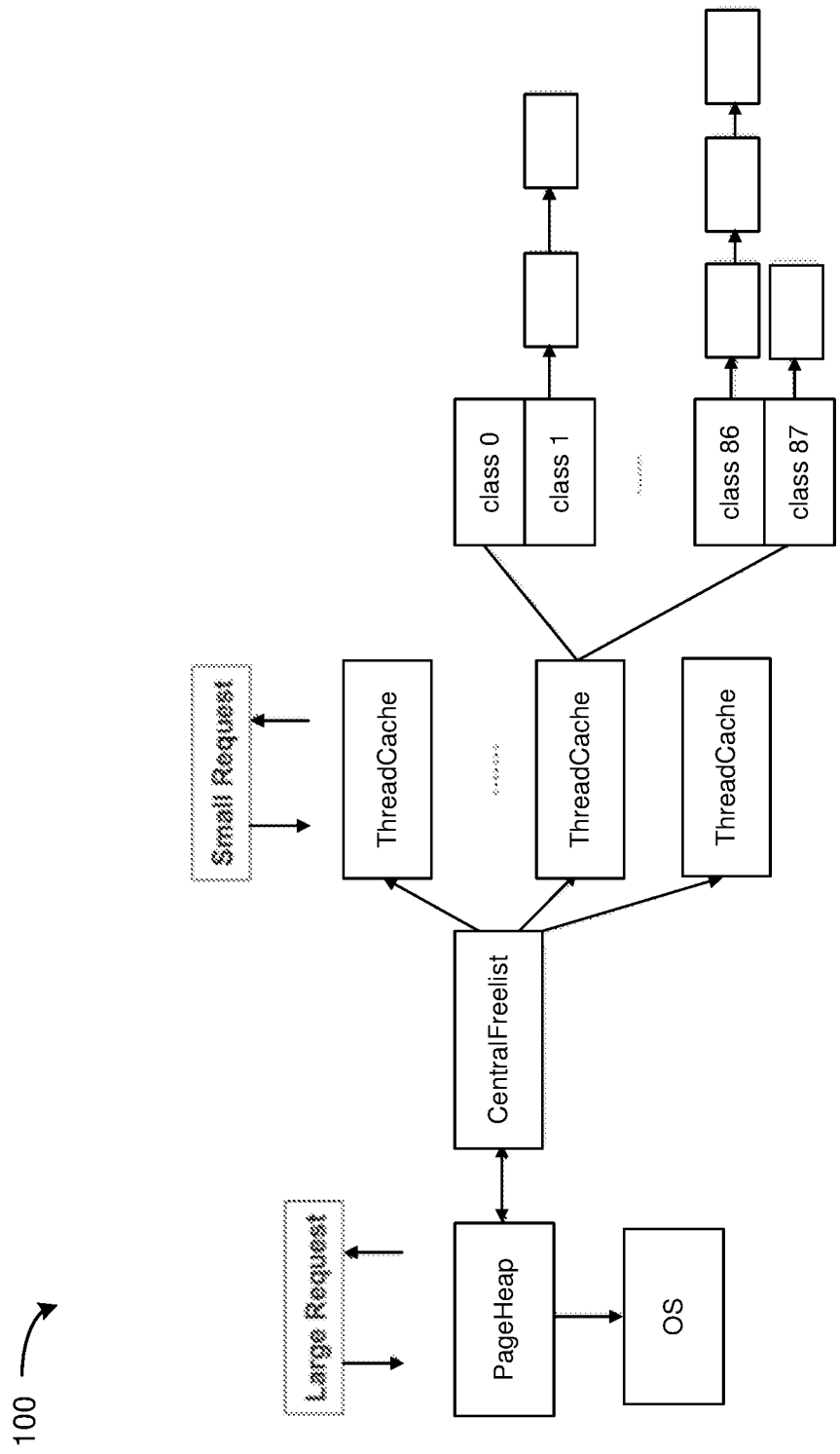
FIG. 1 shows an overview of requests for memory allocations.

FIG. 1 shows an overview of requests for memory allocations for a scenario 100. Smaller than 1-page sized requests can be made using a thread cache. However, if the thread cache does not have the memory region of the size requested, a central cache can be accessed to provide allocable regions to fulfill the memory request. In some examples, the thread cache can be proactively replenished so that there are no or few empty memory segments and the central cache may not need to be accessed. If a central cache finds a specific memory object queue is empty, it will request more objects from a page heap. A page heap queue can share spare memory span objects with a central cache and a memory span object can be broken into smaller memory objects and enqueued for sharing with a thread cache. Larger requests (e.g., a page or larger) can be made directly to a page heap.

Figure 2:
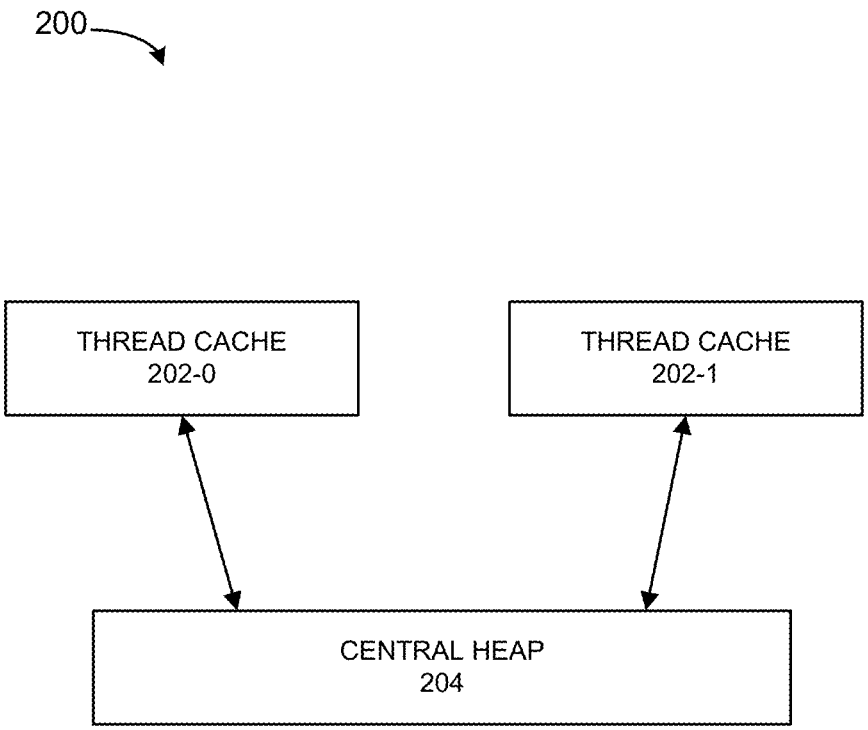
FIG. 2 depicts an example of a scheme for free memory object management.

FIG. 2 depicts an example of a TCMalloc scheme for free memory object management in scenario 200. In TCMalloc, a thread has access to a local thread cache 202-0 and 202-1 that contains free memory objects managed by linked lists. A memory object can be a region of cache, memory or storage that is to be allocated to a particular software application or device for use to store or access content. A software thread can obtain a memory object from local cache 202-0 or 202-1 without accessing and locking any centralized data structure. However, memory segments in central heap 204 may need to be accessed if cache 202-0 or 202-1 do not have a memory segment to allocate.

Figure 3:
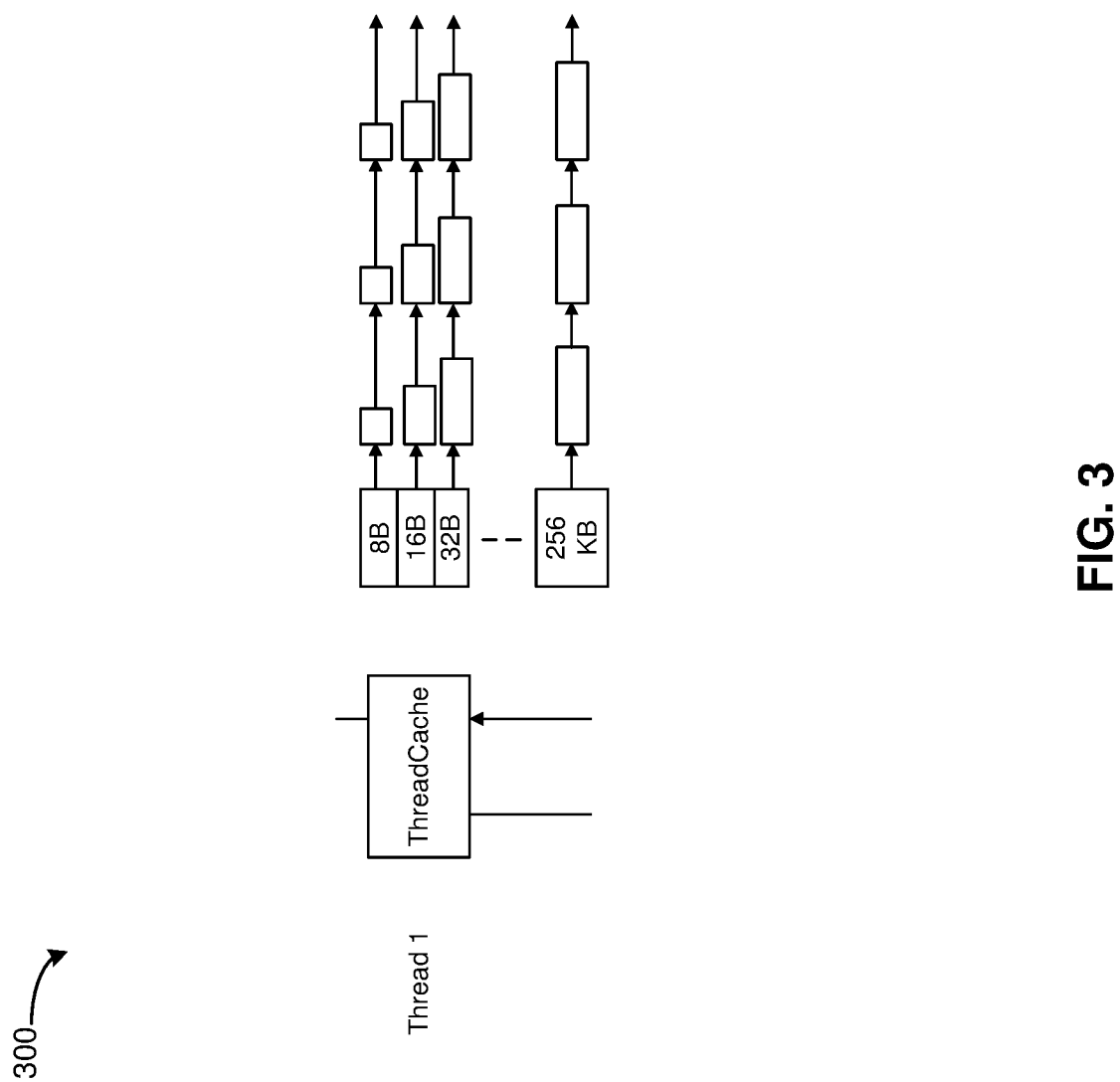
FIG. 3 depicts an example of a scheme of a local cache organization.

FIG. 3 depicts an example of a TCMalloc scheme of a local cache organization in scheme 300. In a thread cache, objects are categorized by size classes. A size class can be a linked-list of free memory objects of that size. For example, in this example, size classes range from 8 bytes (8B) to 256 kilobytes (256 KB). Various available 8B regions can be associated using a linked-list or other data structure. Likewise, 16B regions can be associated using a linked-list, and so forth. For example, when software requests a memory allocation for memory of a certain size, one of the linked lists that matches the requested size will provide an object from the linked list, and provide a pointer of the object back to the requester.

In some examples, if the linked list of the local thread cache is empty, a central cache can be accessed to obtain new memory objects. In a similar manner as the local cache, a central cache includes linked lists of memory spans. A memory span can be composed of many contiguous memory pages (e.g., 4 KB, 8 KB or other sized memory page). A memory span can be separated into smaller-sized memory objects. The objects of the same size can be managed in a linked list. The central cache can distribute objects to a local thread cache if requested. A central cache can be shared by multiple threads. In some cases, locks are used to prevent contention from simultaneous accesses.

If there are no free objects in a central cache, or if there is a request for a large object (e.g., larger than objects in the central cache), a page heap can be accessed. A page heap can contain a linked list of different sizes of memory spans. Free memory spans can be granted to the central cache, and the memory span can be divided into smaller memory objects that are distributed to the local thread cache to provide for memory allocation.

Figure 4:
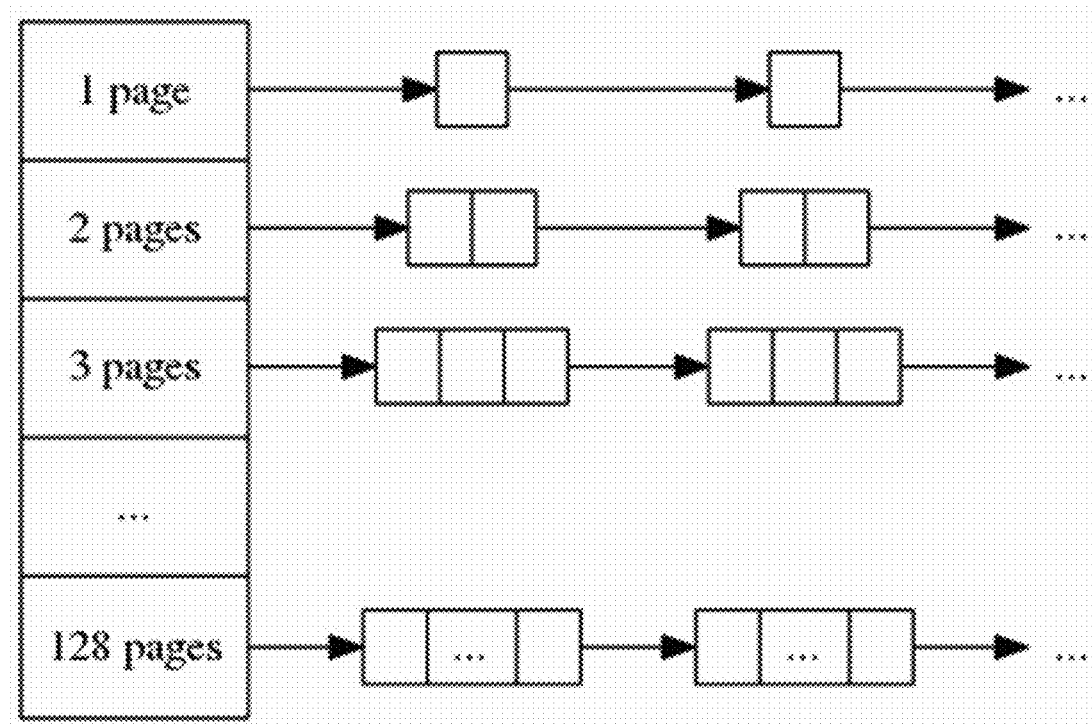
FIG. 4 shows an example organization of various memory spans in a page heap.

FIG. 4 shows an example organization of various memory spans in a page heap. A page heap can provide memory allocation for a page or larger sized memory allocation requests. Memory spans can be various sizes of multiples of a page size (e.g., 1 page, 2 page, and so forth). In some examples, a page can be 4096 bytes in size, although other sizes can be used. Memory spans can be organized as linked lists and a memory span could consist of multiple contiguous pages. A linked list can include memory spans of the same size. For example, in FIG. 4, a linked list includes memory spans that are 1-page in size, another linked list includes memory spans that are 2-page in size, and so forth.

Various embodiments provide a work scheduler to manage memory allocations. For example, management of allocation or deallocation of a central cache (or memory segment cache) and/or page heap can be performed by a work scheduler. In some examples, a CPU can offload to a work scheduler management of allocation or deallocation of a central cache and/or page heap. The work scheduler can queue operations for core-to-core communications and schedule work to various cores or other devices in a manner such as that described in U.S. Patent Application Publication 2017/0286337, entitled "TECHNOLOGIES FOR A DISTRIBUTED HARDWARE QUEUE MANAGER" and U.S. Patent Application Publication 2017/0192921, entitled "MULTI-CORE COMMUNICATION ACCELERATION USING HARDWARE QUEUE DEVICE," both of which are incorporated by reference in their entirety. In other examples, management of allocation or deallocation of a central cache and/or page heap can be performed by an offload engine circuitry that is dedicated to such task or performs another task such as an offload engine circuitry that a CPU can use to perform compression/decompression or encryption/decryption.

In some examples, a work scheduler can use a volatile memory (e.g., static random access memory (SRAM) or other memory) to allocate multiple logical queues to represent available memory objects of a central cache and page heap. In some examples, a queue can store a reference to a specific memory object size and the object can be identified by a starting address and size. The work scheduler can use command queues to receive commands from various cores or software for memory allocation, memory deallocation, or garbage collection (examples of which are described herein). The work scheduler can use a response queue to provide responses to received commands.

A memory allocation function call can take the form of pseudocode: Void*ptr=malloc(N), where N is a memory size to allocate. A corresponding command or instruction provided to the work scheduler can be of a format such as REQMEM R64 to request a memory allocation with an operand of the allocated memory address being returned by the work scheduler to the requester.

Allocation circuitry and garbage collection circuitry or other processors can be utilized by the work scheduler to perform memory management. The work scheduler can be programmed to dequeue or enqueue memory objects. Software (e.g., operating system or application) can use a dequeue instruction to request a memory allocation to dequeue memory objects from the work scheduler to cache in a local memory object cache, instead of from a software-managed central cache or page heap. Software can use an enqueue instruction for garbage collection or memory deallocation to enqueue deleted memory objects to the work scheduler. In turn, the work scheduler can allocate the deallocated memory objects from the work scheduler instead of allocating memory regions from a software-managed central cache or page heap.

Use of a work scheduler to manage memory object allocation can provide for streamlining of software instructions related to memory allocation into a single instruction so that the memory allocation-related operations are handled by the work scheduler instead of using various instructions related to memory allocation that are executed by the CPU. In some examples, locking operations of a central cache or page heap are not used where various applications or devices request memory allocations, as the work scheduler manages multiple and time or memory region overlapping requests for memory allocation, deallocation, or garbage collection using its work queues and prioritization. Multiple cores can provide requests to a single queue concurrently without any software locking overhead.

Core-to-core cache line bouncing can involve sharing a centralized software data structure among cores whereby one core can write a cache line and when another core reads the cache line, the another core remotely accesses the content from the writing core's local CPU cache. In some examples, core-to-core cache line bouncing is not used as a data structure such as a central cache or page heap are managed by the work scheduler.

In some examples, because management of allocation, de-allocation, freeing, or garbage collection of memory objects can be performed by the workload engine and offloaded from being performed by the CPU, the CPU can be freed to perform other operations. Garbage collection can include overwriting the de-allocated memory with zeros, ones, or patterns of zeros and ones. Reducing CPU utilization in the data center for memory allocation can improve the efficiency of CPU performance with regard to processing tasks, which in turn can reduce the total cost of ownership (TCO) for cloud providers who own CPUs.

Figure 5:
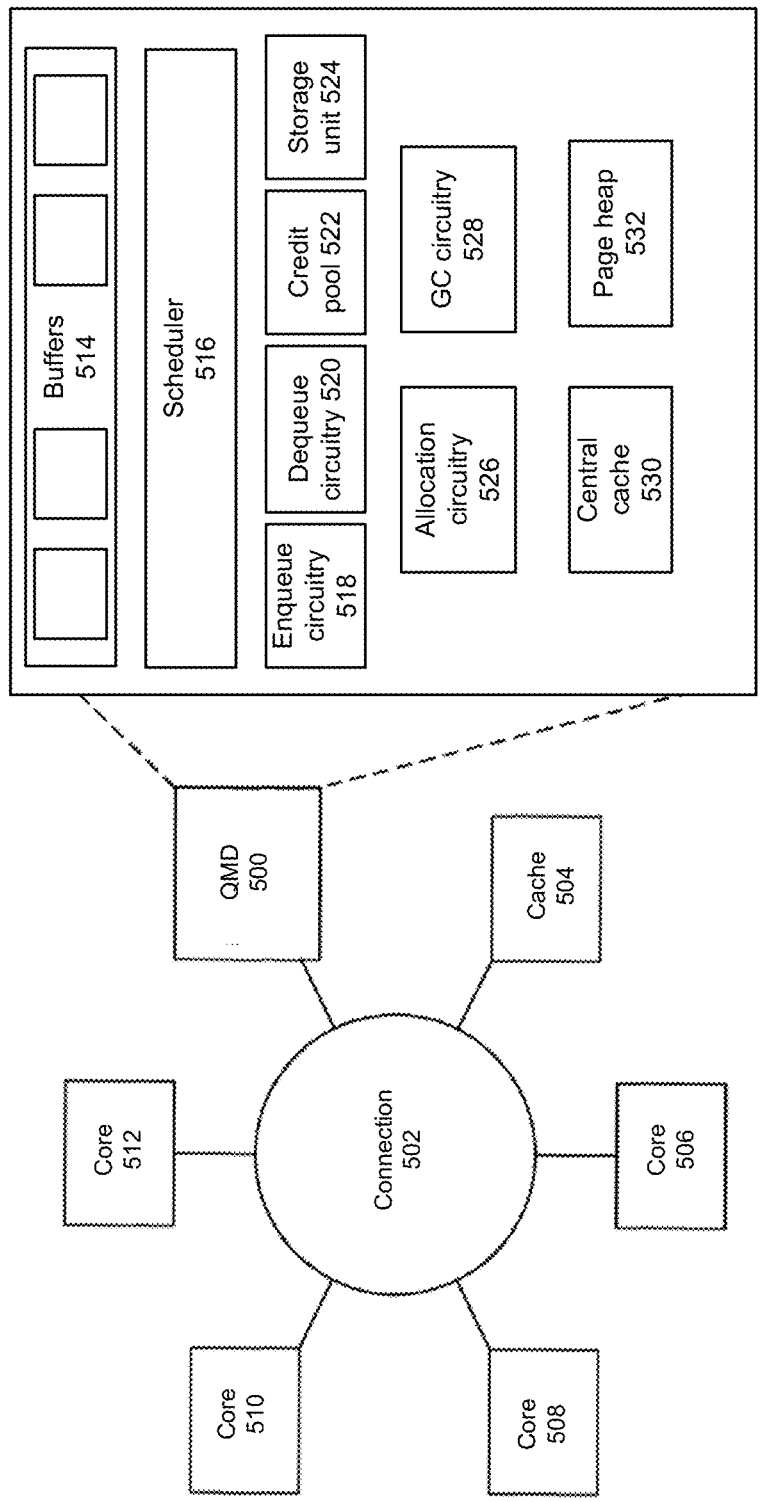
FIG. 5 depicts an example system.

FIG. 5 depicts an example system. Queue management device (QMD) 500 can be attached to a high-speed or network-on-chip ("NoC") interconnect. Connection 502 is shown in the figure as this interconnect but other network or fabric formations, such as a ring or mesh, may be used. The high-speed interconnect connects the CPU cores 506-512 and cache 504 with QMD 500. Although not illustrated in the diagram, there may be additional CPU cores, caches, and/or other devices connected to connection 502. Connection 502 among CPU cores 506-512, cache 504, and QMD 500 may be a special dedicated interconnect or an existing shared interconnect.

A core can be an execution core or computational engine that is capable of executing instructions. A core can have access to its own cache and read only memory (ROM), or multiple cores can share a cache or ROM. Cores can be homogeneous and/or heterogeneous devices. Any type of inter-processor communication techniques can be used, such as but not limited to messaging, inter-processor interrupts (IPI), inter-processor communications, and so forth. Cores can be connected in any type of manner, such as but not limited to, bus, ring, or mesh.

A core may support one or more instructions sets (e.g., the x86 instruction set (with some extensions that have been added with newer versions); the MIPS instruction set of MIPS Technologies of Sunnyvale, CA; the ARM instruction set (with optional additional extensions such as NEON) of ARM Holdings of Sunnyvale, CA), including the instruction(s) described herein.

Enqueue and dequeue requests sent out by the CPU cores can be transferred to QMD 500. In some embodiments, where acknowledgement is to be provided to a requester, QMD 500 sends a response back to the requesting core after each successful enqueue or dequeue operation to acknowledge the completion of the request or at least receipt of the request. In some embodiments, where acknowledgement is not required, a path between the requesting core and QMD 500 allows a request to be submitted without returning an acknowledgement back to the requesting core, as long as sufficient request resources are provided or reserved.

QMD 500 can include or use one or more buffers (collectively labeled as 514), a scheduler 516, an enqueue circuitry 518, a dequeue circuitry 520, a credit pool controller 522, and an internal storage unit 524. Enqueue and dequeue requests sent from requesting CPU cores are first received and stored by QMD 500 into one of buffers 514. Buffers 514 temporarily store the incoming requests as the QMD 500 may not have enough resources or bandwidth to serve all the incoming requests at the moment they are received. The buffers can be first-in-first-out (FIFO) queues where the first request into the buffer will be the first request out of the buffer. In some embodiments, a subset of buffers is allocated to store only enqueue requests while another subset is reserved for only dequeue requests. Other ways for allocating the buffers, such as by core, by thread, by request type, etc., may also be used. A single priority level may be assigned across all the buffers to simplify implementation and to maximize throughput. Alternatively, multiple priority levels may be implemented to support fine-grained Quality of Service (QoS) features. For example, given n priorities, an enqueue and dequeue buffer pair may be assigned a different priority such that n buffers are allocated for enqueue requests and n buffers are allocated for dequeue requests. An incoming request has a priority that is either pre-assigned by the requesting core/thread or assigned by QMD 500 upon receipt by QMD 500. A request is then stored in a buffer that corresponds to the request's priority (1-$n$) and/or type (enqueue or dequeue).

Scheduler 516 chooses a buffer among buffers 514 and selects one or more requests from the head of buffer. The buffer is chosen according to a scheduling policy. Various scheduling policies, such as Round Robin, Weighted Round Robin, preemptive priority, and a combination of these and other policies may be implemented. In a Round Robin policy, for example, the buffers are simply chosen sequentially, e.g., lowest buffer ID to the highest, or vice versa. If a chosen buffer is empty, scheduler 516 selects from a different buffer. In a Weighted Round Robin policy, scheduler 516 chooses and serves each buffer sequentially based on their associated priority. The ability to control the order in which to serve the buffers is called request-level flow control. After choosing a buffer and selecting one or more requests from the head of the chosen buffer, the scheduler 516 schedules each selected requests for execution by either the enqueue circuitry 518 or dequeue circuitry 520 according to the request type.

Enqueue circuitry 518 and dequeue circuitry 520 read and write to the QMD's internal storage unit 524 through ports. An enqueue request executed by the enqueue circuitry 518 causes one data item to be inserted into the internal storage unit 524. A dequeue request executed by the dequeue circuitry 520 causes one data item to be retrieved from the internal storage unit 524 and sent to the output queue. If a request cannot be executed by the enqueue or dequeue engine, it may be inserted back to the tail of the buffer to be processed later. This can reduce the chances of deadlocking a requesting core or device.

Storage unit 524 can be used for storing queues and queue entries. It may be comprised of Static Random Access Memory ("SRAM"), Dynamic Random Access Memory ("DRAM"), or any other suitable memory technology. Storage unit 524 is configurable to support any number of queues as well as different queue sizes. A queue entry can include metadata and opaque data. Metadata can include information relating to the queue entry itself, such as queue ID (QID), priority, format, and length. Information contained in each queue entry's metadata is used by QMD 500 to perform enqueue and dequeue related operations on that entry. The opaque data portion contains the actual data, or pointers to actual data, to be shared with consumer core, thread, device, etc. via a dequeue request. The opaque data portion is generally ignored and untouched by the QMD 500, although it can be processed.

In some embodiments, a credit management system operates a credit pool controller 522 to manage and track a number of credit pools. Through controlling the credits in a credit pool, the credit management system can adjust the rate and frequency at which the incoming requests are sent by the requesting cores and threads and prevent an overflow of incoming requests that may cause core stalls or request drops. This, in turn, improves the efficiency of both the requesting cores and threads, as well as QMD 500.

When a core or thread sends an enqueue or dequeue request to QMD 500, it acquires the appropriate credit from the credits pool controller 522. A request received by QMD 500 without the appropriate credit will be refused acceptance and/or dropped by QMD 500. In some embodiments, credit pool controller 522 maintains a global enqueue credit pool and a global dequeue credit pool. The size of these global credit pools correspond respectively to the QMD's total capacity for handling incoming enqueue and dequeue requests. Credit pool controller 522 maintains one pair of local enqueue and dequeue credit pool for a core or thread. The size of a pair of local enqueue and dequeue credit pool correspond to the amount of QMD's capacity allocated to that particular core or thread. A local credit pool may be maintained by a core or thread, or alternatively, tracked centrally by credit pool controller 522. By controlling the size of each local credit pool and the rate in which they are replenished, credit pool controller 522 has fine grain control over the number of enqueue/dequeue requests that are sent by each core or thread.

For example, credit pool controller 522 may implement a credit replenishment policy such as Round Robin or Weighted Round Robin to decide when and how much to replenish each local credit pool.

In some examples, QMD 500 can be used to allocate and deallocate memory regions in a central cache and page heap. However, QMD 500 may not be used for memory allocation or deallocation of a local thread cache because local thread cache is managed by core-executed software, e.g., when the local cache is in a private CPU cache.

In connection at least with memory allocation, deallocation or garbage collection operations, allocation circuitry 526, garbage collection (GC) circuitry 528, central cache 530 and/or page heap 532 can be used. For example, memory allocation, deallocation or garbage collection requests can be provided to a buffer of buffers 514. For execution of a memory allocation request, allocation circuitry 526 can determine if a requested memory region is available in central cache 530 or page heap 532 and provide a response of allocated memory to the requester core or re-queue the request for later execution in the event the memory region is not available. For execution of a memory deallocation request, GC circuitry 528 can deallocate a memory region specified in the memory deallocation request and provide the deallocated memory region into central cache 530 or page heap 532. For example, deallocation of the local thread cache can be initiated by processor-executed software (e.g., operating system or application) whereby if the local thread cache is full, the software can deallocate the local thread cache (e.g., through garbage collection) to QMD 500 and QMD 500 performs a deallocation request. Additional examples of the operations of memory allocation, deallocation or garbage collection are provided herein.

In examples where a local thread cache is used and managed by processor-executed software, software sends allocation or deallocation requests to QMD 500 when a local thread cache is empty or full. For example, when processor-executed software cannot allocate memory objects from the local thread cache due to empty object lists, the software sends the allocation request to QMD 500. For example, when the processor-executed software deallocates a memory object but its local thread cache is full, the software sends the deallocation request to the QMD 500 to provide the objects back to the central cache 530.

By offloading memory allocation and deallocation to QMD 500, access to a central cache or page heap can be accelerated. At least for applications that are sensitive to tail latency and jitter reducing (e.g., database and packet processing applications), QMD 500 can reduce latency or provide more deterministic latency for memory allocation.

Central cache 530 can be implemented as a set of queues that store memory objects. Similarly, page heap 532 can be implemented as a set of queues that stores memory spans. QMD 500 can also perform queue management as long as there are enough available QIDs left beyond QIDs used for memory allocation. In some examples, QMD 500 can be configured to prioritize QID allocations for memory allocations or deallocations over other uses (e.g., non-memory management workload distribution among processors). The priority can be decided by QMD 500 based on heuristics. For example, QMD 500 can use a threshold-based policy that prioritizes memory allocation or deallocation operations when memory allocation and deallocation operation frequency is over certain threshold. Otherwise, a fixed set of dedicated queues can be specified during system configuration time to provide a number of QID resources available for memory allocation or deallocation operations.

Figure 6:
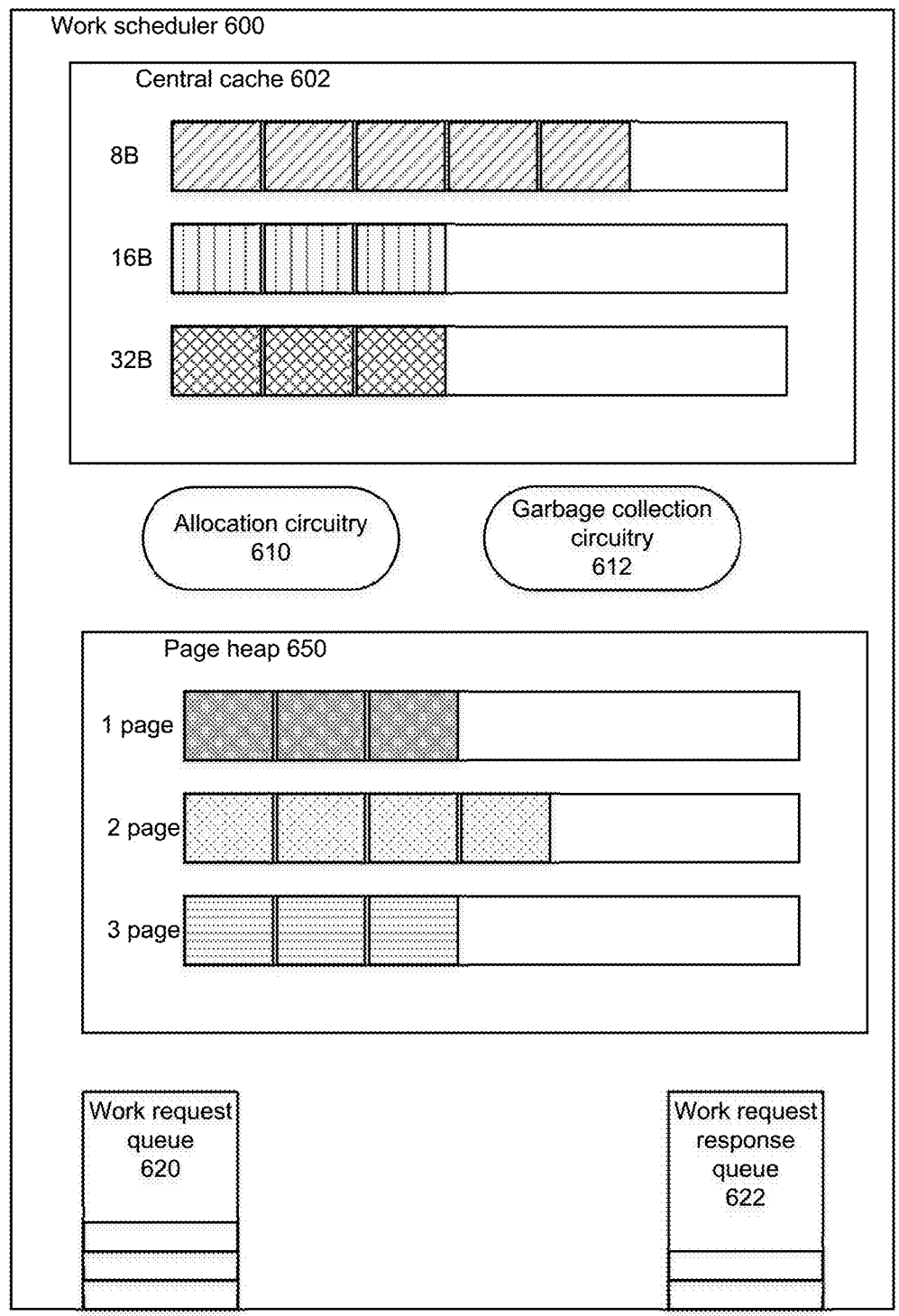
FIG. 6 depicts an example of a work scheduler.

FIG. 6 depicts an example of a work scheduler. Enqueuing of free memory regions into one or more queues of work scheduler 600 can occur in a variety of circumstances. At CPU boot or re-start, kernel code running on a CPU can provide requests to enqueue free memory regions into central cache 602 or page heap 650 of work scheduler 600. In some examples, when a core-executed application requests a memory allocation via work request queue 620, work scheduler 600 can request an operating system (OS) kernel to enqueue objects by providing a work request to work request queue 620. For example, central cache 602 can store identifiers of memory objects available for allocation of various sizes (e.g., 8B, 16B, 32B and so forth). Similarly, page heap 650 can store identifiers of memory objects available for allocation of various sizes (e.g., 1 page, 2 pages, 3 pages, and so forth). A memory object can be identified by a starting address and size.

A core can request work scheduler 600 for a memory allocation. In some examples, where a core executes an OS and user application, the user application can directly message work scheduler 600 instead of requesting the OS to provide a memory management command to work scheduler 600 via a system call. In some cases, for memory allocation or deallocation, the user application calls a memory allocation library for execution in user space, which in turn calls work scheduler 600 for a memory allocation. Although, in other examples, the user application can request OS to perform a memory management operation, and the OS requests work scheduler 600 to handle memory management involving central cache 602 or page heap 650.

For example, a malloc operation will first seek available memory objects from a local thread cache. If there are available free objects in local cache, an available memory object is allocated and the address is identified (e.g., virtual or physical address and size). If a local cache does not have a memory region available to satisfy the memory allocation request, a work request is enqueued in work request queue 620.

Work scheduler 600 orders memory allocation or deallocation requests in work request queue 620 to permit multiple different cores to request memory segments from central cache 602 or page heap 650 and avoid conflict for memory allocations from central cache 602 or page heap 650. Work scheduler 600 manages memory allocation requests to prevent different threads from being allocated a same or overlapping memory region.

Work scheduler 600 can allocate a requested memory allocation to a QID of central cache queue 602. A QID can be an identifier of a queue that stores a memory object. A dequeue instruction with a QID can be executed by work scheduler 600. If the queue associated with the QID is not empty, work scheduler 600 will return the memory address which is the return value of the malloc( ). If the memory allocation request can be satisfied, a first object in central cache 602 can be provided to the application as the return value of malloc( ). The memory object that is allocated can be deleted from central cache 602.

If the memory allocation request cannot be satisfied using a memory object in central cache 602 or central cache 602 is empty, allocation circuitry 610 or other processor can segment a page or larger size into smaller segments and provide the segments for inclusion in central cache 602. Allocation circuitry 610 can automatically dequeue a memory span from page heap queues 650, and enqueue resulting memory objects into the central cache queues 602.

When a memory object is deleted from a local cache, work scheduler 600 performs a memory deallocation. The software that implements memory allocation and deallocation function calls will first try to insert this memory object into the local thread cache. To keep the size of the central cache under control, garbage collection circuitry 612 can operate during deallocation. For thread cache garbage collection, software (e.g., operating system or user application) can enqueue objects back to work scheduler 600 when the number of objects in a certain thread cache is larger than a threshold. These objects will be returned back to the central cache queue 602 or, if the object is a large object, to page heap 650. For an object to be provided to central cache queue 602 or page heap 650, an enqueue instruction is provided to work request queue 620 of work scheduler 600. The size of the object can be mapped to the QID for the enqueue command. If the corresponding queue of central cache 602 is full, an error can be returned and a central cache garbage collection carried out to clear space in central cache 602.

Garbage collection circuitry 612 or other processor can combine memory segments from central cache 602 into larger memory segments for inclusion in central cache 602 or in page heap 650. For example, multiple contiguous 8B entries can be combined into a single 16B entry, multiple 16B entries, or a single 32B entry. In some examples, garbage collection circuitry 612 can combine multiple contiguous memory entries in central cache 602 into one or more pages for inclusion in page heap 650.

Garbage collection can be initiated by a user application via a library function call executed in user space. For garbage collection concerning central cache 602, garbage collection circuitry 612 internally sorts memory objects based on their memory address. Contiguous objects that compose a larger segment size in central cache 602 can be removed and saved as a larger segment size in central cache 602. Contiguous objects that compose at least a memory page will be removed from central cache 602 and allocated in page heap queues 650. A page address will be enqueued into the page heap. Garbage collection can be performed periodically by the garbage collection engine 612 or passively when a queue's size is above certain threshold level.

During garbage collection from central cache, if there are no contiguous memory objects to combine, the queue size for central cache 602 can be enlarged. If the queue size cannot be enlarged, certain memory objects can be dequeued from the same memory span and put into a list. One or more segment from this list can be combined into a memory span and committed to page heap 650.

Garbage collection circuitry 612 can combine contiguous pages of page heap 650 into a larger memory span. For example, contiguous pages in 1-page memory span can be combined and enqueued into the 2-page memory span, whereas 2-page spans can be combined and enqueued to the 4-page span and so forth. In response to a request for an object with sizes larger than the largest memory objects (e.g., 256 KB), a memory span can be received directly from page heap queue 650. Corresponding deallocation can directly enqueue the memory span to the page heap queue.

In response to a request for an object having a size larger than the largest memory span (e.g., 128 pages*8 KB each page), memory space can be allocated using a kernel system call. However, various embodiments can be used to support these objects. For example, at least one other queue can be allocated in or for use by work scheduler 600 to enqueue objects that are larger than a largest page size in page heap 650.

Figure 7A:
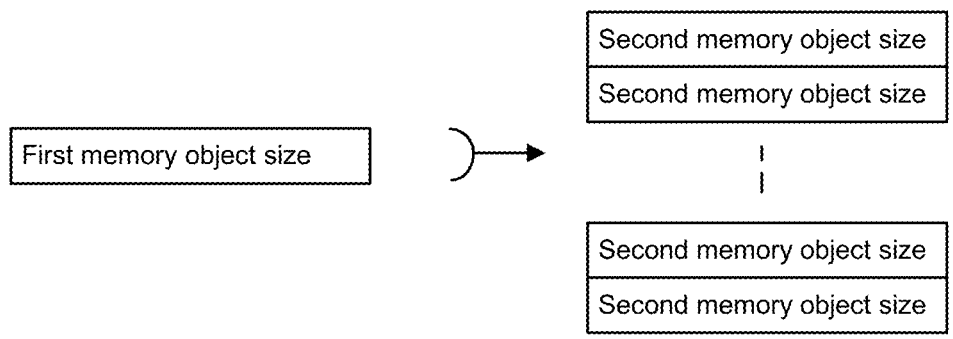
FIG. 7A depicts an example of segmentation of a memory object.

FIG. 7A depicts an example of segmentation of a memory object of a first size to multiple memory objects of a second size. In some examples, the first size can be a 1 page and a second size can be 32B. One or more objects of the second memory object size can be provided in a central cache or thread cache.

Figure 7B:
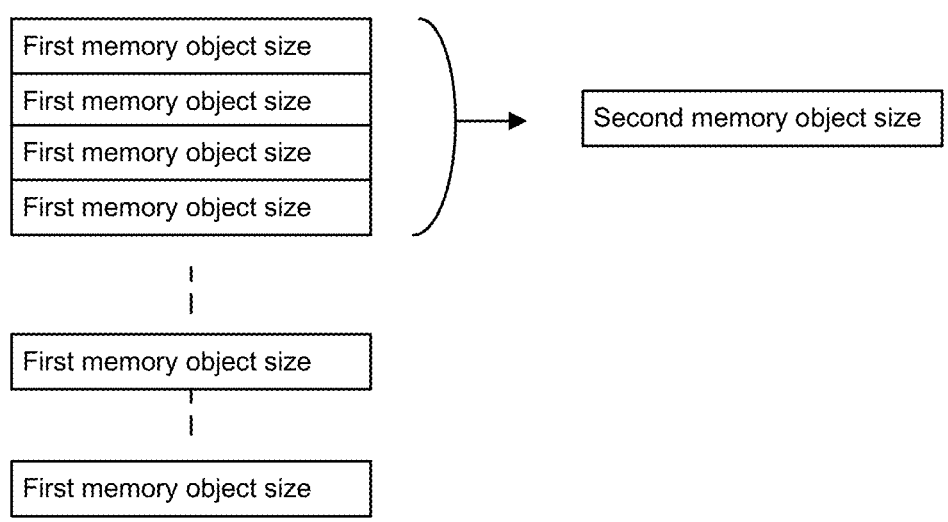
FIG. 7B depicts an example of coalescing of contiguous memory objects.

FIG. 7B depicts an example of coalescing of contiguous memory objects. In this example, a group of four contiguous first memory object sized elements are combined into a second memory object size. The second memory object size can be provided in a central cache or page heap.

Figure 8:
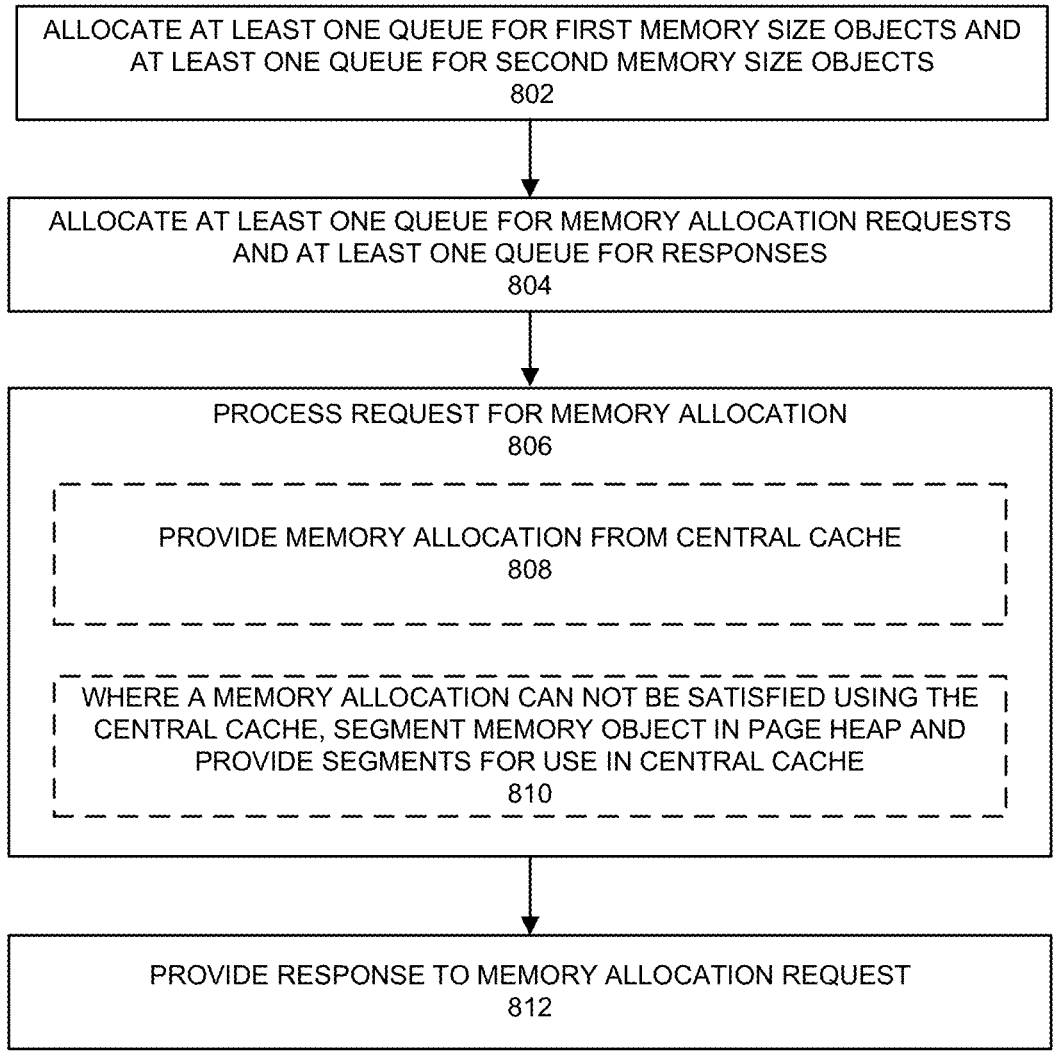
FIG. 8 depicts a process performed by a work scheduler.

FIG. 8 depicts a process performed by a work scheduler. The work scheduler can be implemented using at least a processor and at least one queue. At 802, at least one queue for memory objects associated with a first size and at least one queue for memory objects associated with a second size can be allocated. For example, at least one queue can be allocated for memory segments of a first size associated with a central cache. For example, at least one queue can be allocated for memory segments of a second size associated with a page heap.

At 804, at least one queue for memory allocation requests and at least one queue for responses to memory allocation requests can be allocated. Queues can be used to receive work requests from one or more devices (e.g., cores, accelerators, devices in a service chain). A work scheduler can select a work request to forward for execution without locking a central cache or page heap.

At 806, a request for memory allocation is processed. For example, 808 and 810 can be performed to process the memory allocation request. At 808, if the request can be satisfied using a memory object in the central cache, a memory object in the central cache is selected and the process proceeds to 812. At 810, if the request cannot be satisfied by a memory object in the central cache, a memory object in the page heap is segmented to provide a memory object in the central cache, a memory object in the central cache is selected and the process proceeds to 812.

At 812, a response to the request for memory allocation with a identifier of the memory object is provided in a response queue. The memory object that is allocated can be deleted from the central cache and provide to a thread cache.

Cache Pre-Fetch and Cache Line Replacement

Receive side scaling (RSS) provides an approach for distributing network traffic among CPUs. RSS distributes network traffic to CPUs in a statistical way by use of a hashing calculation across multiple connections and by use of an indirection table. The number of hash buckets can correspond to a number of CPUs and corresponding queues in use. The hash-based distribution works well for many traffic flows. However, when a packet is scheduled for processing by a core, relevant content (e.g., any of packet data, packet context, a software environment, cryptographic keys, connection context, or instructions executed to process the packet) may not be readily available in cache or memory for use by the core. In the event that the relevant content used to process the packet are not available in the cache, the relevant content are to be fetched from the memory. As a result, the core performs idle wait while the cache loads the relevant content. An idle core slows down the packet processing. Moreover, packet processing performance can degrade and deterministic completion of packet processing time expected by customers may not be achieved.

Cache replacement schemes such as least recently used (LRU) can be based on past usage of cache lines whereby cache lines that contain content that is widely used is more likely to be kept in a cache and not evicted. While making cache line eviction decisions, cache eviction schemes may not take into account the current workload queued for execution to the CPU and cache eviction schemes can potentially remove data from the cache which is immediately needed to process a very next packet.

Software pre-fetch instructions can load data into cores but on a speculative basis as programmers guess what data will be needed by the core. Software pre-fetch involves changing or modifying current applications to support pre-fetch and also needs to be fine-tuned to pre-fetch needed content. Some data pre-fetchers detect a memory access pattern to pre-fetch next lines from memory into a cache however it happens after a pattern is learned or found. But many cache loads are triggered by cache miss.

Various embodiments use a work scheduler to allocate a packet for processing by a processor and providing relevant content used by the processor in a cache prior to when the packet is processed. For example, relevant content can be one or more of: any of packet data, packet context, flow data, a software environment or instructions executed to process the packet. Various embodiments provide application program interfaces (APIs) to an application or software to program a look-up table accessible by the work scheduler to identify relevant content for received packets. Application performance can be increased as cache misses are reduced by work scheduler making content available through cache line retention or hardware pre-fetch.

According to various embodiments, the work scheduler manages content in the cache to prevent eviction of content for use by a processor before the processor will access or process the content. For example, the work scheduler can assign a priority to content in the cache depending on its associated packet's place in line of content to be processed from the work queue. For content that has an associated packet at a back of a queue to be processed by the processor, the work scheduler can assign a low priority and the content is more likely to be permitted to be evicted. For a packet that is a head of line (or queue) and will be processed by the processor next or imminently, the work scheduler can assign a high priority to the packet's associated content to make the associated content less likely to be permitted to be evicted. Various embodiments attempt to retain cache lines for which work is pending in the queues and will be imminently served by the processor.

In some examples, if relevant content is not cached, the work scheduler provides hints to a pre-fetcher to load relevant content for a particular packet processing activity before the processor is to process the packet. For example, if a packet entry is at or near a head of a queue (e.g., to be processed next), the work scheduler can notify a prefetcher to load relevant content into a cache. A cache eviction circuitry (CEC) can manage content of a cache used by one or more processors. Based on the priority as well as other factors such as least recently used (LRU) or other eviction schemes (e.g., most recently used (MRU), first-in-first-out), the CEC can decide which content of the cache to evict to make room for other content.

In some examples, the work scheduler can assign a received packet for processing by a core according to any scheme, such as load balancing or grouping packets that are to be processed using the same instructions to be processed by the same one or more processors. Work scheduler can reallocate a particular packet to another processor if work scheduler detects a workload of a processor is too high or latency of processing the particular packet will be too high.

In some examples, work scheduler can assign work to various entities (e.g., cores, accelerators, other processors). Work scheduler manages an order of execution and decides how entities can prepare to perform work. Work scheduler can prepare entities for upcoming tasks by changing power states (e.g., wake up entity or reduce power supplied to an entity after its work is completed), starting virtualized execution environments (e.g., virtual machine or container executing on a core or processor), fetching relevant cryptographic keys, or pre-loading TCP control block (e.g., sequence number, congestion window, outstanding packets, out of order queue information, and so forth) or other context information for use. For example, context information can include one or more of: MAC context information, IP context information, application context information, and so forth.

In some examples, for service chains where data processing (e.g., encryption/decryption or packet processing) occurs using multiple entities connected via any type of connection (e.g., network, fabric, interconnect, or bus), work scheduler can prepare individual links in the chain for imminent processing of a packet. For example, a work scheduler can prepare each entity prior to its expected processing of data powering up the entity, loading a virtual execution environment, or loading relevant content.

A virtualized execution environment can include at least a virtual machine, process containers, machine containers, or application processes. A virtual machine (VM) can be software that runs an operating system and one or more applications. A VM can be defined by specification, configuration files, virtual disk file, non-volatile random access memory (NVRAM) setting file, and the log file and is backed by the physical resources of a host computing platform. A VM can be an OS or application environment that is installed on software, which imitates dedicated hardware. The end user has the same experience on a virtual machine as they would have on dedicated hardware. Specialized software, called a hypervisor, emulates the PC client or server's CPU, memory, hard disk, network and other hardware resources completely, enabling virtual machines to share the resources. The hypervisor can emulate multiple virtual hardware platforms that are isolated from each other, allowing virtual machines to run Linux® and Windows® Server operating systems on the same underlying physical host.

A container can be a software package of applications, configurations and dependencies so the applications run reliably on one computing environment to another. Containers can share an operating system installed on the server platform and run as isolated processes. A container can be a software package that contains everything the software needs to run such as system tools, libraries, and settings. Containers are not installed like traditional software programs, which allows them to be isolated from the other software and the operating system itself. Isolation can include access of memory by a particular container but not another container. The isolated nature of containers provides several benefits. First, the software in a container will run the same in different environments. For example, a container that includes PHP and MySQL can run identically on both a Linux computer and a Windows machine. Second, containers provide added security since the software will not affect the host operating system. While an installed application may alter system settings and modify resources, such as the Windows registry, a container can only modify settings within the container.

Although examples are described with respect to packet processing, any type of processing can be performed such as but not limited to: encryption/decryption, encoding/decoding, machine learning, inference models, and so forth.

Figure 9:
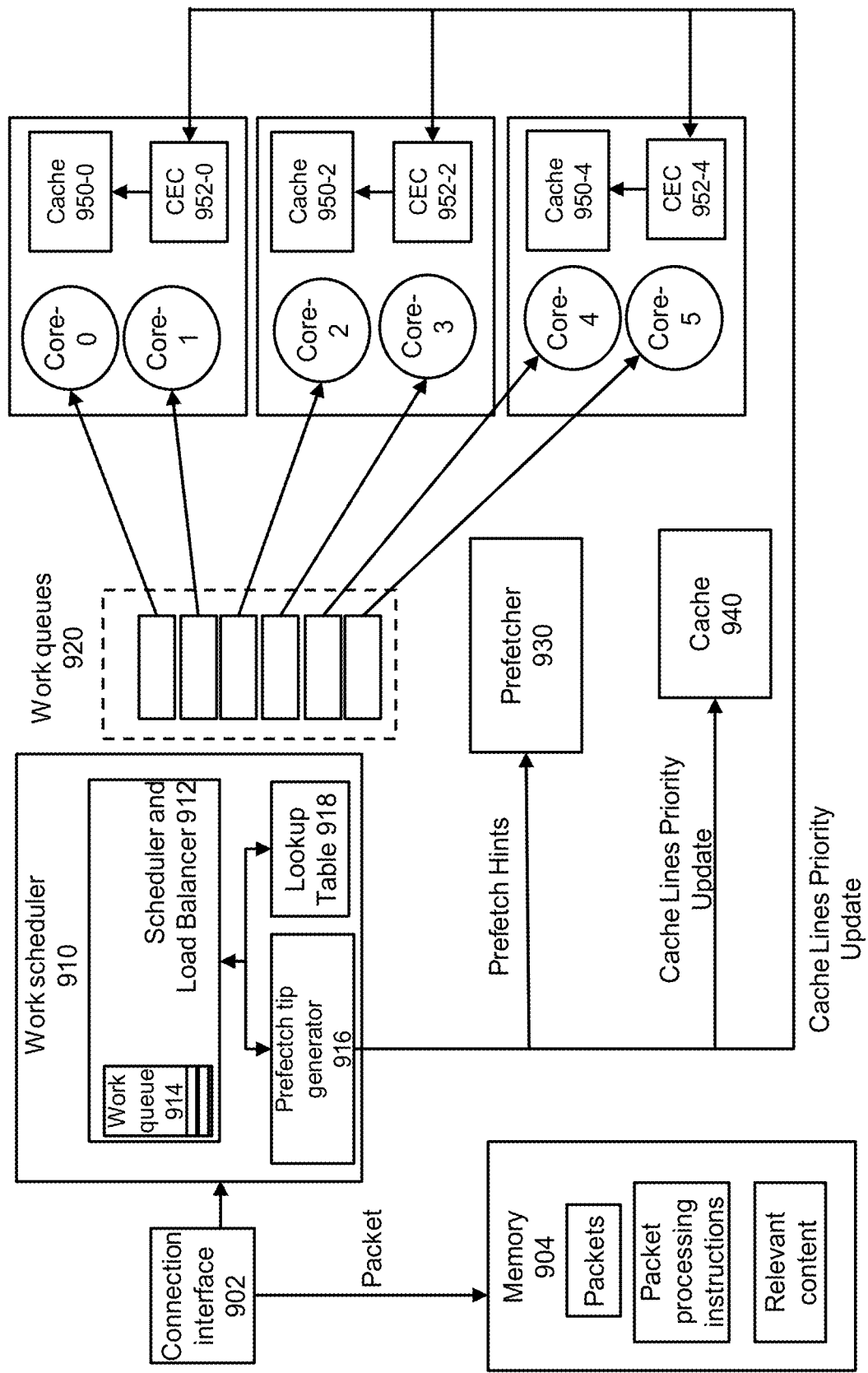
FIG. 9 depicts a system.

FIG. 9 depicts a system. Various embodiments use work scheduler 910 to assign a workload to a processor (e.g., any of core-0 to core-5 or other numbers or cores or other devices) and control when to pre-fetch relevant content to a cache or memory used by the processor for the workload based on a position of an identifier of the workload in a work queue 920 associated with the processor. Work scheduler 910 can use a look-up table 918 to determine memory location(s) in memory 904 of relevant content for a workload. Relevant content or information can include one or more of: packet data, packet context, flow data, connection context, data, a software environment (e.g., virtual machine or container), cryptographic keys to use to encrypt or decrypt content, or instructions executed to process the packet.

Work scheduler 910 can track a position of a workload as it moves within a work queue. Note that in some examples, a workload moves through a work queue 920 as other workloads in the same work queue are completed. However, to improve performance or load balance, work scheduler 910 can re-arrange workloads in a work queue or move a workload to another work queue and update the position in a work queue.

As the workload moves closer to the head of a work queue 920 for a processor, which will be executed next or within a next several workloads, work scheduler 910 can indicate to pre-fetcher 930 to prefetch content to a cache or memory (e.g., middle level cache (MLC) or other level of cache) used by the processor. In some examples, work scheduler 910 can flag content that is closer to a head of work queue 920 using a cache line priority update as being less permitted to be evicted or overwritten from the cache or memory used by the processor. Cache eviction circuitry (CEC) 952-0 to 952-4 for one or more processors can determine which content in a cache or memory to evict to memory or storage based on a position flag for the workload in the workload queue. CEC can prevent relevant content from being evicted from cache or memory when processing or use of the relevant content is imminent.

A connection interface 902 can be one or more of: a network interface, fabric interface, interconnect interface, bus interface and so forth. For example, a network interface, described with respect to FIG. 13, or switch, described with respect to FIG. 14, can be used to receive packets from a medium (e.g., wired or wireless). As or after a connection interface receives a packet from a medium, connection interface 902 can store the packet into memory 904 and indicate receipt of a packet to a work queue 914 of work scheduler 910. For example, connection interface 902 can indicate receipt of a packet by providing a packet descriptor to work queue 914 of work scheduler 910. The descriptor can indicate a location in memory 904 in which at least a portion of a received packet is stored by connection interface 902. In addition, the descriptor can include header information of received packets.

A packet can include a formatted collections of bits that may be sent across a network, such as Ethernet frames, IP packets, TCP segments, UDP datagrams, quick UDP Internet Connections (QUIC) and so forth. Also, as used in this document, references to L2, L3, L4, and L7 layers (or layer 2, layer 3, layer 4, and layer 7) are references respectively to the second data link layer, the third network layer, the fourth transport layer, and the seventh application layer of the OSI (Open System Interconnection) layer model. A packet can include a header and payload. A header can be a media access control (MAC) source and destination addresses, Ethertype, Internet Protocol (IP) source and destination addresses, IP protocol, Transmission Control Protocol (TCP) port numbers, virtual local area network (VLAN) or Multi-Protocol Label Switching (MPLS) tags, and so forth.

A packet can be associated with a flow. A flow can be one or more packets transmitted between two endpoints. A flow can be identified by a set of defined tuples, such as two tuples that identify the endpoints (e.g., source and destination addresses). For some services, flows can be identified at a finer granularity by using five or more tuples (e.g., source address, destination address, IP protocol, transport layer source port, and destination port).

For example, based on header fields of a received packet, work scheduler 910 can determine a flow, class of service (CoS), traffic class (TC), or other classification or designation of a received packet and access look-up-table to determine processing that is to take place on the received packet. Work scheduler 910 can use the packet header information to perform a look-up using look-up table 918 to determine how the received packet is to be processed and which processor (e.g., core-0 to core-5) is to process the received packet. In some examples, an association of packet type to memory address of relevant content can be programmed in lookup table 918. Applications are capable of associating packet types to memory pages where relevant data and relevant content is located. In some cases, a packet type can have associated data and relevant content localized to certain memory pages.

An example format of an entry in look-up table 918 is below.

| Header fields | Memory address of relevant content and size |
|---|---|
| IP destination address = 00x00 | 0000x0000 |
| IP destination address = 00x00 and IP source address = 00x11 | 0000x0001 |
| . . . | . . . |

According to various embodiments, relevant content can include packet or data processing activity stored in executable binary format, machine code, or any type of machine-executable instructions in memory 904. Packet processing activity can include processing of received packets such as one or more of: determination if a packet is valid (e.g., correct Ethernet type, correct checksum, correct IP Protocol type, valid layers 4-7 protocol type), determination of packet destination (e.g., next hop, destination queue), perform one or more of: IP filter checks, flow table lookup, access control lists (ACL), firewall, match-actions operations, outgoing port selection using a forwarding table, packet or data decryption, packet or data encryption, denial of server protection, packet counting, billing, traffic management/conditioning, traffic shaping/traffic scheduling, packet marking/remarking, packet inspection of layers 4-7, or traffic load balancing/load distribution. For example, packet processing process can apply Data Plane Development Kit (DPDK) or OpenDataPlane compatible processing. Service or function chaining can be applied where a packet is processed by multiple devices.

Packet processing can perform packet processing using Network Function Virtualization (NFV), software-defined networking (SDN), virtualized network function (VNF), Evolved Packet Core (EPC), or 5G network slicing. Some example implementations of NFV are described in European Telecommunications Standards Institute (ETSI) specifications or Open Source NFV Management and Orchestration (MANO) from ETSI's Open Source Mano (OSM) group. VNF can include a service chain or sequence of virtualized tasks executed on generic configurable hardware such as firewalls, domain name system (DNS), caching or network address translation (NAT) and can run in virtual execution environments. VNFs can be linked together as a service chain. In some examples, EPC is a 3GPP-specified core architecture at least for Long Term Evolution (LTE) access. 5G network slicing can provide for multiplexing of virtualized and independent logical networks on the same physical network infrastructure.

Work scheduler 910 can allocate a packet for processing by a core by placing a work descriptor into work queue 920. In this example, work queue 920 can include various queues to order work to be performed by a particular core. In some examples, a queue is allocated per core to store work to be performed by a core. Accordingly, a queue is allocated for core-0, another queue is allocated for core-1, and so forth. In some examples, a single queue can be allocated for all cores or multiple queues for multiple cores or a single core. Work can be ordered in a work queue based on priority of performance such that a head of line of the queue stores a descriptor for a packet that is to be processed very next and a back of line of the queue stores a descriptor for a packet that is to be processed last.

For example, an example format of a work descriptor stored in work queue 920 can be as follows.

| Packet identifier | Priority Level |
|---|---|
| Descriptor (e.g., memory location that stores relevant content) | [00, 01, 10, or 11] |

Any type of allocation of packet processing among cores can occur. For example, workloads can be balanced across cores to even the distribution of work. In some configurations, one or more cores perform the same packet processing activity on different packets and packet processing instructions are pinned in their cache (e.g., cannot be deleted until unpinned or power is lost).

Work scheduler 910 can monitor a position of a work descriptor in work queue 920 as the work descriptor or work identifier moves to the front of the line for a particular processor. Work scheduler 910 can use prefetch tip generator 916 to indicate a place in line of a packet in work queue 920. A priority level can be assigned to a packet based on its position in line. Some embodiments use a two bit value to indicate 4 different priorities at the packet level, as shown earlier. Level 00 is a default level and can indicate there is no priority assessed. Values of 01, 10 and 11 can indicate increasing levels of priorities. For example, value 01 can indicate a low priority where a packet reaches a starting position in the queue. For example, value 10 can indicate a medium priority where a packet reaches a middle position in the queue that is not the beginning. For example, value 11 can indicate a high priority where a packet reaches a front position in the queue and is potentially within a next 5-10 packets to be processed (or other value).

CEC 952-0 to 952-4 can use priority level information to retain cache lines in cache 950-0 to 950-4 for which work is pending in the queues served by its associated core. CEC 952 can refer to any or all of CEC 952-0 to 952-4. For example, CEC 952 may not evict a packet and associated relevant content having a high priority. A format of an entry for a cache line entry used by CEC 952 can be as follows.

| Cache line number | Cache Priority Level |
|---|---|
| 0000x0000 | [00, 01, 10, or 11] |

After a cache line is accessed, priority level can be reset to 00.

In some examples, packet processing instructions can be stored in a cache line and receive their own designation of priority separate from a packet data. For example, if multiple packets are to be processed using the same packet processing instructions, then packet processing instructions can be afforded a highest priority in the cache so that the packet processing instructions can be reused for multiple packets and not re-loaded from memory.

CEC 952 may be more likely to evict a medium priority packet and associated relevant content than that of a high priority packet. CEC 952 may be more likely to evict a low priority packet and associated relevant content than that of a high priority or medium priority packet. In some examples, if multiple packets of the same type are to be processed using work descriptors in the same queue, the priority level for the packets and/or the packet instructions can be enhanced to potentially prevent eviction. For example, 4 packets of the same type that are to be processed using the same packet processing instructions can receive highest priority level. Any type of cache eviction policy can be used such as least recently used (LRU), MRU, first-in-first-out, and others.

Note that any of cache 940 and cache 950-0 to 950-4 can include one or more of: a cache (e.g., L1, L2, L3, middle level cache (MLC) last level cache (LLC)), memory (e.g., DDR compatible memory or HBM compatible memory), byte addressable persistent memory (e.g., Intel Optane®), storage (e.g., NAND or 3D NAND), or 2-level memory (2LM). In some examples, cache 940 can act as a lower level cache and store content also stored in any of cache 950-0 to 950-4.

In some examples, thin memory provisioning in memory 904 can be used. Under thin memory provisioning, physical storage resources initially allocated to application programs are less than virtual storage resources allocated to application programs or other software. Under provisioning or thin provisioning can be a memory allocation allocated to a processor (e.g., an executed a virtual execution environment or executed application) being greater than an actual amount of physical addressable memory allocated among the memory and/or the memory pool to the processor.

Note that instead of or in addition to use of a cache to store packet data and/or relevant content, various embodiments can use at least two levels of memory ("2LM"). By use of 2LM, data can be moved to near memory when it is closer to being needed for processing a packet. Copying content from far memory to near memory can reduce latency of availability of content. 2LM can include cached subsets of system disk or SSD-level storage (in addition to, for example, run-time data). This main memory includes a first level (alternatively referred to herein as "near memory") including smaller faster memory made of, for example, DRAM or other volatile memory (e.g., LLC, MLC, L2 or L1 cache); and a second level (alternatively referred to herein as "far memory") which includes larger and slower (with respect to the near memory) volatile memory (e.g., DRAM, LLC, MLC, L2) or nonvolatile memory storage (e.g., flash memory or byte addressable non-volatile memory (e.g., Intel Optane® or Samsung Z-NAND®)). The far memory is presented as "main memory" to the host operating system (OS), while the near memory is a cache for the far memory that is transparent to the OS, thus rendering the embodiments described below to appear the same as prior art main memory solutions. The management of the two-level memory may be done by a combination of logic and modules executed via the host central processing unit (CPU). Near memory may be coupled to the host system CPU via high bandwidth, low latency means for efficient processing. Far memory may be coupled to the CPU via low bandwidth, high latency means (as compared to that of the near memory).

Work scheduler 910 can monitor packet position and priority information and determine when a particular packet is to be processed. Before the packet is to be processed, work scheduler 910 provides a hint to pre-fetcher 930 to cause pre-fetch of data and/or relevant content into a cache 950 used by a core to process the particular packet. In some examples, if some data and/or relevant content are already stored in a cache of a core that is to process a packet, pre-fetch occurs for data and/or relevant content that is not stored in such cache. For example, when a packet position is near the head of line and is afforded a high priority designation (e.g., value of 11), pre-fetcher 930 can load uncached packet data and relevant content into the relevant cache. Some triggers can result in single or few lines being pre-fetched and some other triggers can set stride to keep fetching next lines after first pre-fetched lines are accessed where content is stored in contiguous lines.

After a core processes content from a cache using associated packet processing code, the associated flow data can be updated and stored to memory 904. The packet and associated flow data can be forwarded to or shared with a next set of cores for further processing or provided to a network interface for transmission.

Although examples described herein are provided for packet processing, any type of data processing can be performed and content pre-fetched and maintained in a cache using a work scheduler. For example, machine learning inference can be performed whereby weights are stored as relevant content. Other processing can include: compression, decompression, cryptography services such as public key encryption (PKE), decryption, authentication, or other capabilities or services.

Examples provided herein relate to use of cores, but any type of processor can be used such as one or more of: processor, core, graphics processing unit (GPU), field programmable gate array (FPGA), application specific integrated circuit (ASIC), programmable logic device (PLD).

Figure 10:
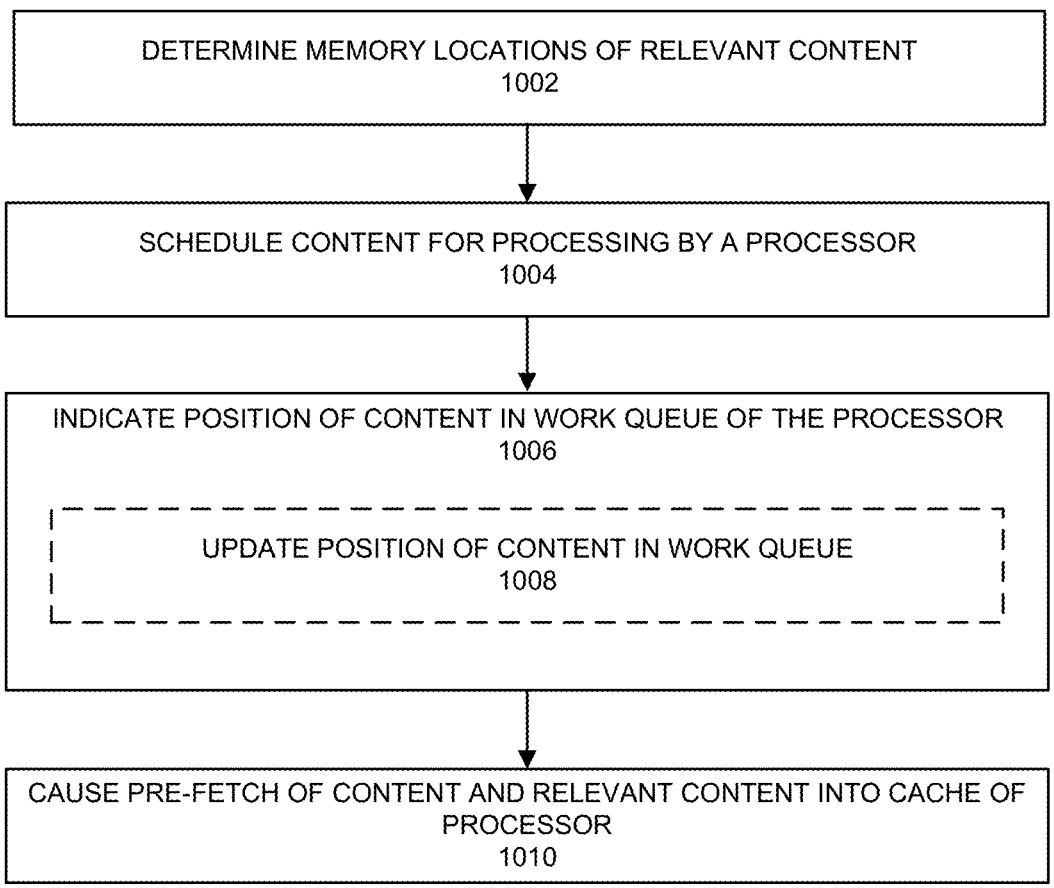
FIG. 10 depicts a process.

FIG. 10 depicts a process that can be performed by a work scheduler to pre-load content into a cache prior to use in processing. At 1002, in response to an indication that processing is to take place, a work scheduler uses a look-up table programmed with the mapping of content types to memory addresses that store associated relevant content. For example, if the content is a packet, various packet header values can be used to determine relevant content. Relevant content can be one or more of: packet data, packet context, a software environment or instructions executed to process the packet.

At 1004, the work scheduler can assign processing of the content to a processor. The work scheduler can queue packets for processing. For example, the work scheduler schedules a highest priority packet to a core's work queue. In some examples, the content is a packet and processing is packet processing. Other type of processing can be performed such as compression, decompression, cryptography such as public key encryption (PKE), decryption, authentication, or other capabilities or services.

At 1006, the work scheduler sends an indication of a position of a work request in a work queue of a processor. For example, position indications can be end-of-queue, middle-of-queue, head-of-queue, or other higher or lower levels of granularity (e.g., more or less precise as to location in a queue). A cache eviction scheme can consider the position of a work request can determine whether or not to evict the content. Prefetched content or content in cache that is associated with a work request that is back of line is more likely to be allowed to be evicted than content associated with a work request that is head of line or middle of line. As a work request moves through the queue towards a head of line, at 1008, the work scheduler indicates a changed position in the work queue.

At 1010, when a work request is positioned at the head of the queue, work scheduler indicates to hardware prefetch logic to copy content and relevant content into a cache used by the processor. This can ensure content and relevant content are in a cache when the processor is to process the content.

Figure 11:
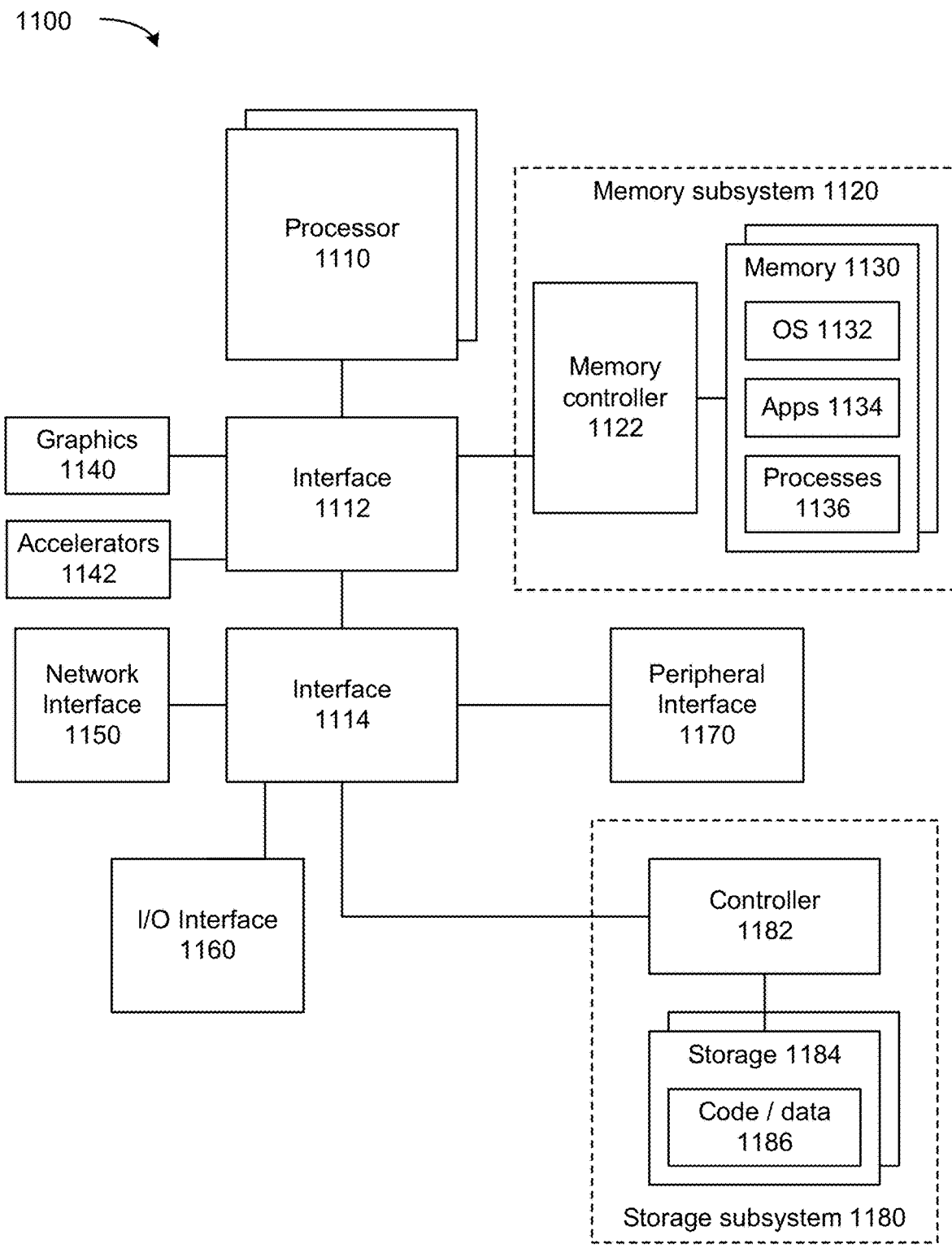
FIG. 11 depicts a system.

FIG. 11 depicts a system. The system can use embodiments described herein to allocate memory and/or to caching of relevant content prior to a processing operation. For example, an accelerator 1142 can include a work scheduler or queue management device that manages memory allocation and/or caches relevant content prior to processing, in accordance with embodiments described herein. System 1100 includes processor 1110, which provides processing, operation management, and execution of instructions for system 1100. Processor 1110 can include any type of microprocessor, central processing unit (CPU), graphics processing unit (GPU), processing core, or other processing hardware to provide processing for system 1100, or a combination of processors. Processor 1110 controls the overall operation of system 1100, and can be or include, one or more programmable general-purpose or special-purpose microprocessors, digital signal processors (DSPs), programmable controllers, application specific integrated circuits (ASICs), programmable logic devices (PLDs), or the like, or a combination of such devices.

In one example, system 1100 includes interface 1112 coupled to processor 1110, which can represent a higher speed interface or a high throughput interface for system components that needs higher bandwidth connections, such as memory subsystem 1120 or graphics interface components 1140, or accelerators 1142. Interface 1112 represents an interface circuit, which can be a standalone component or integrated onto a processor die. Where present, graphics interface 440 interfaces to graphics components for providing a visual display to a user of system 1100. In one example, graphics interface 1140 can drive a high definition (HD) display that provides an output to a user. High definition can refer to a display having a pixel density of approximately 100 PPI (pixels per inch) or greater and can include formats such as full HD (e.g., 1080p), retina displays, 4K (ultra-high definition or UHD), or others. In one example, the display can include a touchscreen display. In one example, graphics interface 1140 generates a display based on data stored in memory 1130 or based on operations executed by processor 1110 or both. In one example, graphics interface 1140 generates a display based on data stored in memory 1130 or based on operations executed by processor 1110 or both.

Accelerators 1142 can be a programmable or fixed function offload engine that can be accessed or used by a processor 1110. For example, an accelerator among accelerators 1142 can provide compression (DC) capability, cryptography services such as public key encryption (PKE), cipher, hash/authentication capabilities, decryption, or other capabilities or services. In some embodiments, in addition or alternatively, an accelerator among accelerators 1142 provides field select controller capabilities as described herein. In some cases, accelerators 1142 can be integrated into a CPU socket (e.g., a connector to a motherboard or circuit board that includes a CPU and provides an electrical interface with the CPU). For example, accelerators 1142 can include a single or multi-core processor, graphics processing unit, logical execution unit single or multi-level cache, functional units usable to independently execute programs or threads, application specific integrated circuits (ASICs), neural network processors (NNPs), programmable control logic, and programmable processing elements such as field programmable gate arrays (FPGAs). Accelerators 1142 can provide multiple neural networks, CPUs, processor cores, general purpose graphics processing units, or graphics processing units can be made available for use by artificial intelligence (AI) or machine learning (ML) models. For example, the AI model can use or include any or a combination of: a reinforcement learning scheme, Q-learning scheme, deep-Q learning, or Asynchronous Advantage Actor-Critic (A3C), combinatorial neural network, recurrent combinatorial neural network, or other AI or ML model.

Multiple neural networks, processor cores, or graphics processing units can be made available for use by AI or ML models.

Memory subsystem 1120 represents the main memory of system 1100 and provides storage for code to be executed by processor 1110, or data values to be used in executing a routine. Memory subsystem 1120 can include one or more memory devices 1130 such as read-only memory (ROM), flash memory, one or more varieties of random access memory (RAM) such as DRAM, or other memory devices, or a combination of such devices. Memory 1130 stores and hosts, among other things, operating system (OS) 1132 to provide a software platform for execution of instructions in system 1100. Additionally, applications 1134 can execute on the software platform of OS 1132 from memory 1130. Applications 1134 represent programs that have their own operational logic to perform execution of one or more functions. Processes 1136 represent agents or routines that provide auxiliary functions to OS 1132 or one or more applications 1134 or a combination. OS 1132, applications 1134, and processes 1136 provide software logic to provide functions for system 1100. In one example, memory subsystem 1120 includes memory controller 1122, which is a memory controller to generate and issue commands to memory 1130. It will be understood that memory controller 1122 could be a physical part of processor 1110 or a physical part of interface 1112. For example, memory controller 1122 can be an integrated memory controller, integrated onto a circuit with processor 1110.

While not specifically illustrated, it will be understood that system 1100 can include one or more buses or bus systems between devices, such as a memory bus, a graphics bus, interface buses, or others. Buses or other signal lines can communicatively or electrically couple components together, or both communicatively and electrically couple the components. Buses can include physical communication lines, point-to-point connections, bridges, adapters, controllers, or other circuitry or a combination. Buses can include, for example, one or more of a system bus, a Peripheral Component Interconnect (PCI) bus, a Hyper Transport or industry standard architecture (ISA) bus, a small computer system interface (SCSI) bus, a universal serial bus (USB), or an Institute of Electrical and Electronics Engineers (IEEE) standard 1394 bus (Firewire).

In one example, system 1100 includes interface 1114, which can be coupled to interface 1112. In one example, interface 1114 represents an interface circuit, which can include standalone components and integrated circuitry. In one example, multiple user interface components or peripheral components, or both, couple to interface 1114. Network interface 1150 provides system 1100 the ability to communicate with remote devices (e.g., servers or other computing devices) over one or more networks. Network interface 1150 can include an Ethernet adapter, wireless interconnection components, cellular network interconnection components, USB (universal serial bus), or other wired or wireless standards-based or proprietary interfaces. Network interface 1150 can transmit data to a device that is in the same data center or rack or a remote device, which can include sending data stored in memory. Network interface 1150 can receive data from a remote device, which can include storing received data into memory. Various embodiments can be used in connection with network interface 1150, processor 1110, and memory subsystem 1120.

In one example, system 1100 includes one or more input/output (I/O) interface(s) 1160. I/O interface 1160 can include one or more interface components through which a user interacts with system 1100 (e.g., audio, alphanumeric, tactile/touch, or other interfacing). Peripheral interface 1170 can include any hardware interface not specifically mentioned above. Peripherals refer generally to devices that connect dependently to system 1100. A dependent connection is one where system 1100 provides the software platform or hardware platform or both on which operation executes, and with which a user interacts.

In one example, system 1100 includes storage subsystem 1180 to store data in a nonvolatile manner. In one example, in certain system implementations, at least certain components of storage 1180 can overlap with components of memory subsystem 1120. Storage subsystem 1180 includes storage device(s) 1184, which can be or include any conventional medium for storing large amounts of data in a nonvolatile manner, such as one or more magnetic, solid state, or optical based disks, or a combination. Storage 1184 holds code or instructions and data 1186 in a persistent state (e.g., the value is retained despite interruption of power to system 1100). Storage 1184 can be generically considered to be a "memory," although memory 1130 is typically the executing or operating memory to provide instructions to processor 1110. Whereas storage 1184 is nonvolatile, memory 1130 can include volatile memory (e.g., the value or state of the data is indeterminate if power is interrupted to system 1100). In one example, storage subsystem 1180 includes controller 1182 to interface with storage 1184. In one example controller 1182 is a physical part of interface 1114 or processor 1110 or can include circuits or logic in both processor 1110 and interface 1114.

A volatile memory is memory whose state (and therefore the data stored in it) is indeterminate if power is interrupted to the device. Dynamic volatile memory requires refreshing the data stored in the device to maintain state. One example of dynamic volatile memory includes DRAM (Dynamic Random Access Memory), or some variant such as Synchronous DRAM (SDRAM). A memory subsystem as described herein may be compatible with a number of memory technologies, such as DDR3 (Double Data Rate version 3, original release by JEDEC (Joint Electronic Device Engineering Council) on Jun. 27, 2007). DDR4 (DDR version 4, initial specification published in September 2012 by JEDEC), DDR4E (DDR version 4), LPDDR3 (Low Power DDR version3, JESD209-3B, August 2013 by JEDEC), LPDDR4) LPDDR version 4, JESD209-4, originally published by JEDEC in August 2014), WIO2 (Wide Input/output version 2, JESD229-2 originally published by JEDEC in August 2014, HBM (High Bandwidth Memory, JESD325, originally published by JEDEC in October 2013, LPDDR5 (currently in discussion by JEDEC), HBM2 (HBM version 2), currently in discussion by JEDEC, or others or combinations of memory technologies, and technologies based on derivatives or extensions of such specifications.

A non-volatile memory (NVM) device is a memory whose state is determinate even if power is interrupted to the device. In one embodiment, the NVM device can comprise a block addressable memory device, such as NAND technologies, or more specifically, multi-threshold level NAND flash memory (for example, Single-Level Cell ("SLC"), Multi-Level Cell ("MLC"), Quad-Level Cell ("QLC"), Tri-Level Cell ("TLC"), or some other NAND). A NVM device can also comprise a byte-addressable write-in-place three dimensional cross point memory device, or other byte addressable write-in-place NVM device (also referred to as persistent memory), such as single or multi-level Phase Change Memory (PCM) or phase change memory with a switch (PCMS), NVM devices that use chalcogenide phase change material (for example, chalcogenide glass), resistive memory including metal oxide base, oxygen vacancy base and Conductive Bridge Random Access Memory (CB-RAM), nanowire memory, ferroelectric random access memory (FeRAM, FRAM), magneto resistive random access memory (MRAM) that incorporates memristor technology, spin transfer torque (STT)-MRAM, a spintronic magnetic junction memory based device, a magnetic tunneling junction (MTJ) based device, a DW (Domain Wall) and SOT (Spin Orbit Transfer) based device, a thyristor based memory device, or a combination of any of the above, or other memory.

A power source (not depicted) provides power to the components of system 1100. More specifically, power source typically interfaces to one or multiple power supplies in system 1100 to provide power to the components of system 1100. In one example, the power supply includes an AC to DC (alternating current to direct current) adapter to plug into a wall outlet. Such AC power can be renewable energy (e.g., solar power) power source. In one example, power source includes a DC power source, such as an external AC to DC converter. In one example, power source or power supply includes wireless charging hardware to charge via proximity to a charging field. In one example, power source can include an internal battery, alternating current supply, motion-based power supply, solar power supply, or fuel cell source.

In an example, system 1100 can be implemented using interconnected compute sleds of processors, memories, storages, network interfaces, and other components. High speed interconnects can be used such as compatible at least with Ethernet, PCIe, Intel QuickPath Interconnect (QPI), Intel Ultra Path Interconnect (UPI), Intel On-Chip System Fabric (IOSF), Omnipath, Compute Express Link (CXL), Hyper-Transport, high-speed fabric, NVLink, Advanced Microcontroller Bus Architecture (AMBA) interconnect, OpenCAPI, Gen-Z, CCIX, 3GPP Long Term Evolution (LTE) (4G), 3GPP 5G, and variations thereof. Communications can be compatible with remote direct memory access (RDMA), InfiniB and, Internet Wide Area RDMA Protocol (iWARP), quick UDP Internet Connections (QUIC), or RDMA over Converged Ethernet (RoCE). Data and logs can be stored and accessed using virtualized storage nodes using a protocol such as NVMe over Fabrics (NVMe-oF).

Embodiments herein may be implemented in various types of computing and networking equipment, such as switches, routers, racks, and blade servers such as those employed in a data center and/or server farm environment. The servers used in data centers and server farms comprise arrayed server configurations such as rack-based servers or blade servers. These servers are interconnected in communication via various network provisions, such as partitioning sets of servers into Local Area Networks (LANs) with appropriate switching and routing facilities between the LANs to form a private Intranet. For example, cloud hosting facilities may typically employ large data centers with a multitude of servers. A blade comprises a separate computing platform that is configured to perform server-type functions, that is, a "server on a card." Accordingly, each blade includes components common to conventional servers, including a main printed circuit board (main board) providing internal wiring (e.g., buses) for coupling appropriate integrated circuits (ICs) and other components mounted to the board.

Figure 12:
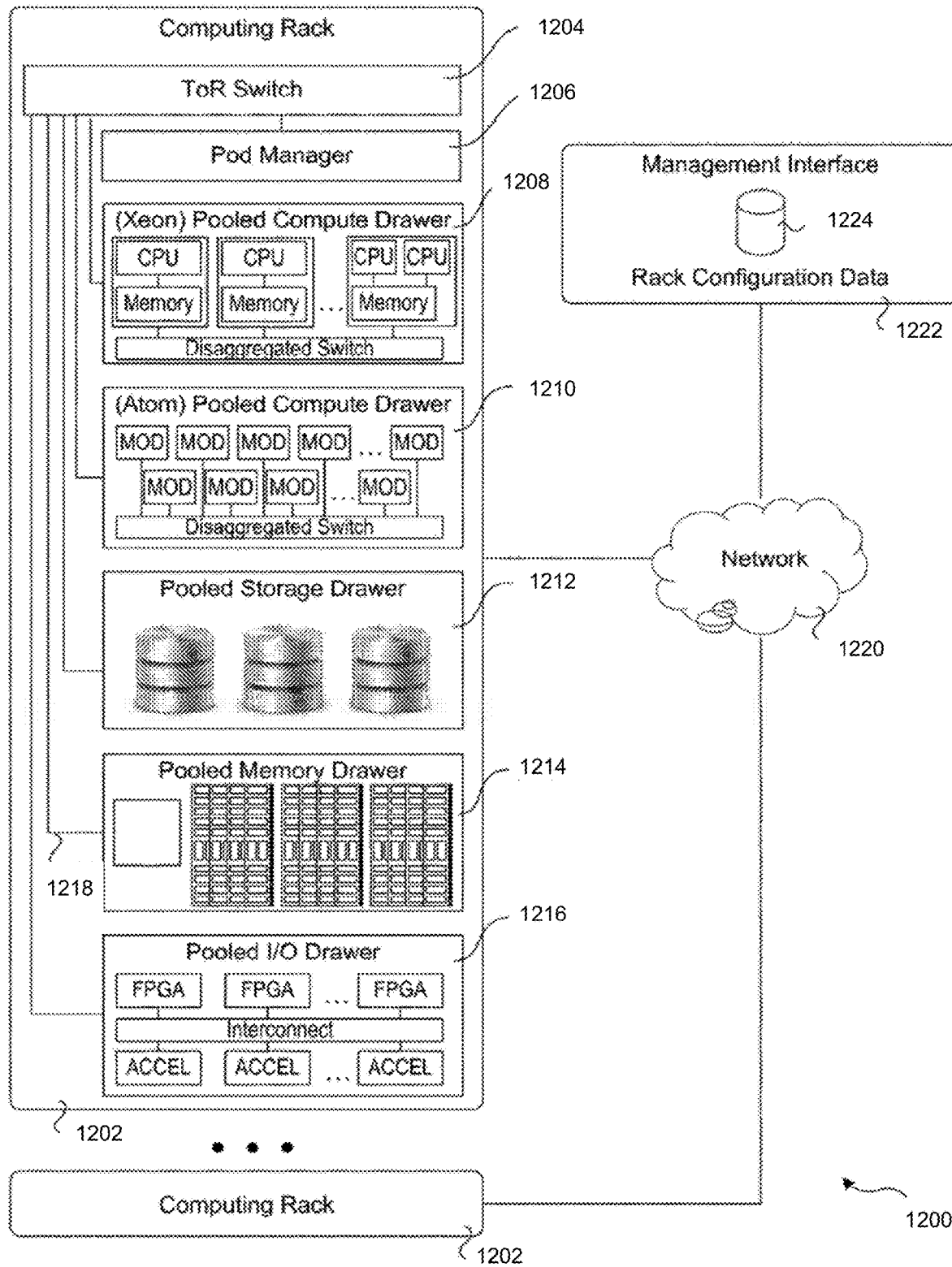
FIG. 12 depicts an environment.

FIG. 12 depicts an environment 1200 includes multiple computing racks 1202, each including a Top of Rack (ToR) switch 1204, a pod manager 1206, and a plurality of pooled system drawers. Various embodiments can use embodiments for remote or local memory erase, program or read operations. Generally, the pooled system drawers may include pooled compute drawers and pooled storage drawers. Optionally, the pooled system drawers may also include pooled memory drawers and pooled Input/Output (I/O) drawers. In the illustrated embodiment the pooled system drawers include an Intel® XEON® pooled computer drawer 1208, and Intel® ATOM™ pooled compute drawer 1210, a pooled storage drawer 1212, a pooled memory drawer 1214, and a pooled I/O drawer 1216. Each of the pooled system drawers is connected to ToR switch 1204 via a high-speed link 1218, such as a 40 Gigabit/second (Gb/s) or 100 Gb/s Ethernet link or a 100+Gb/s Silicon Photonics (SiPh) optical link. In one embodiment high-speed link 1218 comprises an 800 Gb/s SiPh optical link.

Multiple of the computing racks 1200 may be interconnected via their ToR switches 1204 (e.g., to a pod-level switch or data center switch), as illustrated by connections to a network 1220. In some embodiments, groups of computing racks 1202 are managed as separate pods via pod manager(s) 1206. In one embodiment, a single pod manager is used to manage all of the racks in the pod. Alternatively, distributed pod managers may be used for pod management operations.

Environment 1200 further includes a management interface 1222 that is used to manage various aspects of the environment. This includes managing rack configuration, with corresponding parameters stored as rack configuration data 1224.

Figure 13:
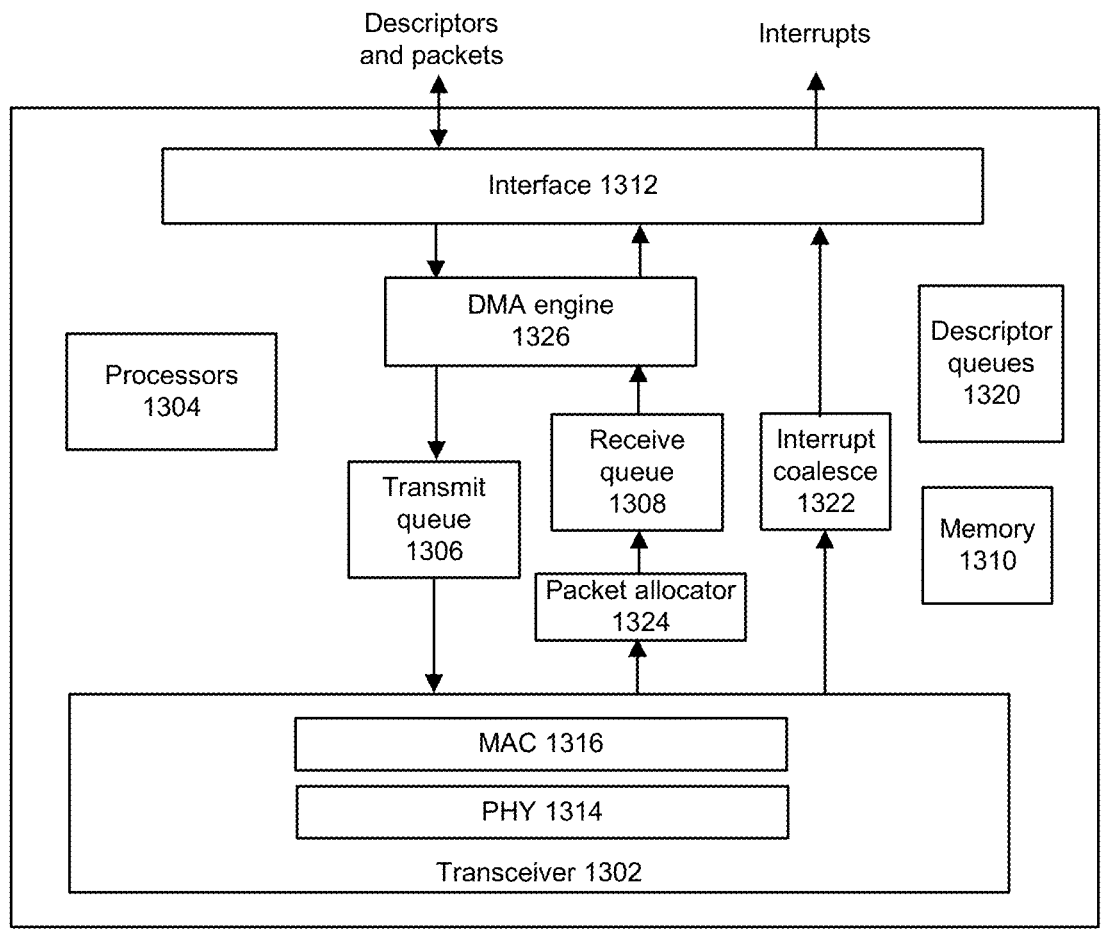
FIG. 13 depicts a network interface.

FIG. 13 depicts a network interface can use embodiments or be used by embodiments. In some examples, a work scheduler can be included in the network interface to prefetch content used for packet processing. Network interface 1300 can include transceiver 1302, processors 1304, transmit queue 1306, receive queue 1308, memory 1310, and interface 1312, and DMA engine 1326. Transceiver 1302 can be capable of receiving and transmitting packets in conformance with the applicable protocols such as Ethernet as described in IEEE 802.3, although other protocols may be used. Transceiver 1302 can receive and transmit packets from and to a network via a network medium (not depicted). Transceiver 1302 can include physical layer (PHY) circuitry 1314 and media access control (MAC) circuitry 1316. PHY circuitry 1314 can include encoding and decoding circuitry (not shown) to encode and decode data packets according to applicable physical layer specifications or standards. MAC circuitry 1316 can be configured to assemble data to be transmitted into packets, that include destination and source addresses along with network control information and error detection hash values. MAC circuitry 1316 can be configured to process MAC headers of received packets by verifying data integrity, removing preambles and padding, and providing packet content for processing by higher layers.

Processors 1304 can be any a combination of a: processor, core, graphics processing unit (GPU), field programmable gate array (FPGA), application specific integrated circuit (ASIC), programmable logic device (PLD) or other programmable hardware device that allow programming of network interface 1300. For example, processors 1304 can provide for allocation or deallocation of intermediate queues. For example, a "smart network interface" can provide packet processing capabilities in the network interface using processors 1304.

Packet allocator 1324 can provide distribution of received packets for processing by multiple CPUs or cores using timeslot allocation described herein or RSS. When packet allocator 1324 uses RSS, packet allocator 1324 can calculate a hash or make another determination based on contents of a received packet to determine which CPU or core is to process a packet.

Interrupt coalesce 1322 can perform interrupt moderation whereby network interface interrupt coalesce 1322 waits for multiple packets to arrive, or for a time-out to expire, before generating an interrupt to host system to process received packet(s). Receive Segment Coalescing (RSC) can be performed by network interface 1300 whereby portions of incoming packets are combined into segments of a packet. Network interface 1300 provides this coalesced packet to an application.

Direct memory access (DMA) engine 1326 can copy a packet header, packet payload, and/or descriptor directly from host memory to the network interface or vice versa, instead of copying the packet to an intermediate buffer at the host and then using another copy operation from the intermediate buffer to the destination buffer.

Memory 1310 can be any type of volatile or non-volatile memory device and can store any queue or instructions used to program network interface 1300. Transmit queue 1306 can include data or references to data for transmission by network interface. Receive queue 1308 can include data or references to data that was received by network interface from a network. Descriptor queues 1320 can include descriptors that reference data or packets in transmit queue 1306 or receive queue 1308. Interface 1312 can provide an interface with host device (not depicted). For example, interface 1312 can be compatible with peripheral connect Peripheral Component Interconnect (PCI), PCI Express, PCI-x, Serial ATA (SATA), and/or Universal Serial Bus (USB) compatible interface (although other interconnection standards may be used).

In some examples, network interface and other embodiments described herein can be used in connection with a base station (e.g., 3G, 4G, 5G and so forth), macro base station (e.g., 5G networks), picostation (e.g., an IEEE 802.11 compatible access point), nanostation (e.g., for Point-to-MultiPoint (PtMP) applications).

In some examples, network interface and other embodiments described herein can be used in connection with a base station (e.g., 3G, 4G, 5G and so forth), macro base station (e.g., 5G networks), picostation (e.g., an IEEE 802.11 compatible access point), nanostation (e.g., for Point-to-MultiPoint (PtMP) applications), on-premises data centers, off-premises data centers, edge network elements, fog network elements, and/or hybrid data centers (e.g., data center that use virtualization, cloud and software-defined networking to deliver application workloads across physical data centers and distributed multi-cloud environments).

Figure 14:
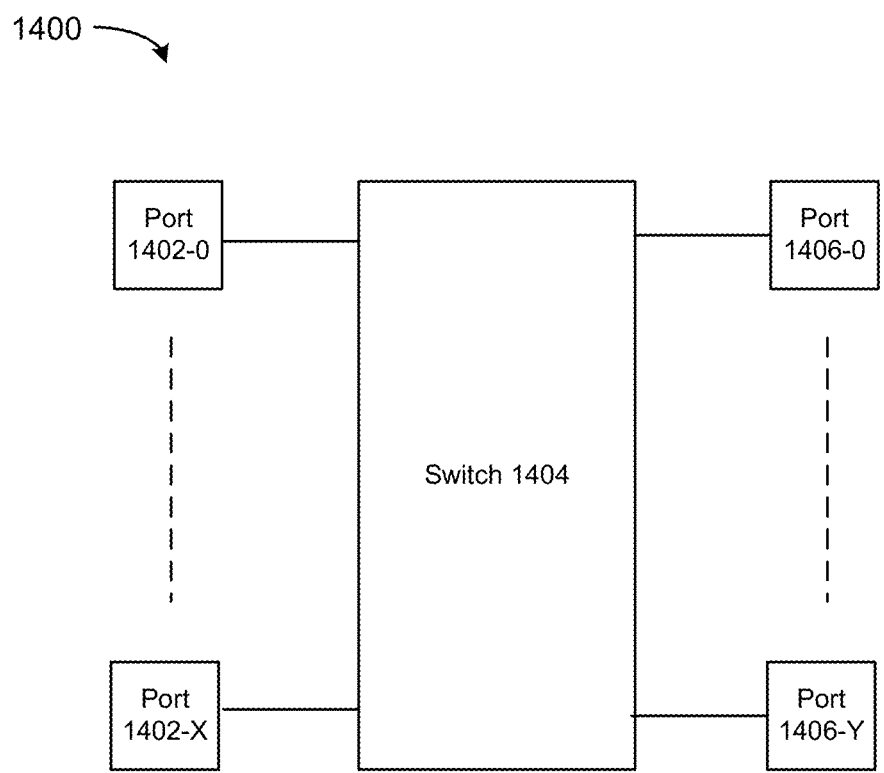
FIG. 14 depicts a switch.

FIG. 14 depicts a switch. Various embodiments of the switch can use a work scheduler to pre-fetch content that is to be used to process a received packet and to send the received packet based on the processing. Switch 1404 can route packets or frames of any format or in accordance with any specification from any port 1402-0 to 1402-X to any of ports 1406-0 to 1406-Y (or vice versa). Any of ports 1402-0 to 1402-X can be connected to a network of one or more interconnected devices. Similarly, any of ports 1406-0 to 1406-X can be connected to a network of one or more interconnected devices. Switch 1404 can decide which port to transfer packets or frames to using a table that maps packet characteristics with an associated output port or match-action tables. In addition, switch 1404 can perform packet replication for forwarding of a packet or frame to multiple ports and queuing of packets or frames prior to transfer to an output port.

Various examples may be implemented using hardware elements, software elements, or a combination of both. In some examples, hardware elements may include devices, components, processors, microprocessors, circuits, circuit elements (e.g., transistors, resistors, capacitors, inductors, and so forth), integrated circuits, ASICs, PLDs, DSPs, FPGAs, memory units, logic gates, registers, semiconductor device, chips, microchips, chip sets, and so forth. In some examples, software elements may include software components, programs, applications, computer programs, application programs, system programs, machine programs, operating system software, middleware, firmware, software modules, routines, subroutines, functions, methods, procedures, software interfaces, APIs, instruction sets, computing code, computer code, code segments, computer code segments, words, values, symbols, or any combination thereof. Determining whether an example is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation. A processor can be one or more combination of a hardware state machine, digital control logic, central processing unit, or any hardware, firmware and/or software elements.

Some examples may be implemented using or as an article of manufacture or at least one computer-readable medium. A computer-readable medium may include a non-transitory storage medium to store logic. In some examples, the non-transitory storage medium may include one or more types of computer-readable storage media capable of storing electronic data, including volatile memory or non-volatile memory, removable or non-removable memory, erasable or non-erasable memory, writeable or re-writeable memory, and so forth. In some examples, the logic may include various software elements, such as software components, programs, applications, computer programs, application programs, system programs, machine programs, operating system software, middleware, firmware, software modules, routines, subroutines, functions, methods, procedures, software interfaces, API, instruction sets, computing code, computer code, code segments, computer code segments, words, values, symbols, or any combination thereof.

According to some examples, a computer-readable medium may include a non-transitory storage medium to store or maintain instructions that when executed by a machine, computing device or system, cause the machine, computing device or system to perform methods and/or operations in accordance with the described examples. The instructions may include any suitable type of code, such as source code, compiled code, interpreted code, executable code, static code, dynamic code, and the like. The instructions may be implemented according to a predefined computer language, manner or syntax, for instructing a machine, computing device or system to perform a certain function. The instructions may be implemented using any suitable high-level, low-level, object-oriented, visual, compiled and/or interpreted programming language.

One or more aspects of at least one example may be implemented by representative instructions stored on at least one machine-readable medium which represents various logic within the processor, which when read by a machine, computing device or system causes the machine, computing device or system to fabricate logic to perform the techniques described herein. Such representations, known as "IP cores" may be stored on a tangible, machine readable medium and supplied to various customers or manufacturing facilities to load into the fabrication machines that actually make the logic or processor.

The appearances of the phrase "one example" or "an example" are not necessarily all referring to the same example or embodiment. Any aspect described herein can be combined with any other aspect or similar aspect described herein, regardless of whether the aspects are described with respect to the same figure or element. Division, omission or inclusion of block functions depicted in the accompanying figures does not infer that the hardware components, circuits, software and/or elements for implementing these functions would necessarily be divided, omitted, or included in embodiments.

Some examples may be described using the expression "coupled" and "connected" along with their derivatives. These terms are not necessarily intended as synonyms for each other. For example, descriptions using the terms "connected" and/or "coupled" may indicate that two or more elements are in direct physical or electrical contact with each other. The term "coupled," however, may also mean that two or more elements are not in direct contact with each other, but yet still co-operate or interact with each other.

The terms "first," "second," and the like, herein do not denote any order, quantity, or importance, but rather are used to distinguish one element from another. The terms "a" and "an" herein do not denote a limitation of quantity, but rather denote the presence of at least one of the referenced items. The term "asserted" used herein with reference to a signal denote a state of the signal, in which the signal is active, and which can be achieved by applying any logic level either logic 0 or logic 1 to the signal. The terms "follow" or "after" can refer to immediately following or following after some other event or events. Other sequences of steps may also be performed according to alternative embodiments. Furthermore, additional steps may be added or removed depending on the particular applications. Any combination of changes can be used and one of ordinary skill in the art with the benefit of this disclosure would understand the many variations, modifications, and alternative embodiments thereof.

Disjunctive language such as the phrase "at least one of X, Y, or Z," unless specifically stated otherwise, is otherwise understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present. Additionally, conjunctive language such as the phrase "at least one of X, Y, and Z," unless specifically stated otherwise, should also be understood to mean X, Y, Z, or any combination thereof, including "X, Y, and/or Z.'"

Illustrative examples of the devices, systems, and methods disclosed herein are provided below. An embodiment of the devices, systems, and methods may include any one or more, and any combination of, the examples described below.

An example provides a hardware queue manager (HQM) circuitry using a credit-based system for allocating queues for use with memory allocation, memory deallocation, and scheduling a workload and fetching content relevant to the workload into a processor's cache before the workload is to be performed.

An example includes an apparatus comprising: a work scheduler comprising at least one processor and at least one work queue, the work scheduler to perform one or more of: provide a memory allocation from a memory segment cache or page heap in response to a request for a memory allocation and/or assign a workload to a processor and control when to pre-fetch content relevant to the workload to store in a memory accessible to the processor based on a position of an identifier of the workload in a work queue associated with the processor.

Example 1 includes an apparatus comprising: a work scheduler comprising at least one processor and at least one queue, wherein the work scheduler is to: receive a request to allocate a region of memory and based on availability of a memory segment associated with a memory segment cache to at least meet the request to allocate a region of memory, provide a memory allocation using an available memory segment entry associated with the memory segment cache from the at least one queue.

Example 2 includes any example, wherein the work scheduler is to: based on unavailability of a memory segment associated with the memory segment cache to satisfy the request to allocate a region of memory, provide a portion of a memory segment associated with a page heap in response to the request to allocate a region of memory.

Example 3 includes any example, wherein the at least one queue is to receive one or more memory allocation requests from multiple devices for performance by the work scheduler.

Example 4 includes any example, wherein the at least one queue is to store at least one memory segment entry associated with the memory segment cache and the at least one queue is to store at least one memory segment entry associated with a page heap.

Example 5 includes any example, wherein a processor is to perform clean up to combine contiguous memory segments associated with the memory segment cache into larger memory segments for association with the memory segment cache or a page heap.

Example 6 includes any example, wherein the processor is to perform garbage collection is to attempt to combine contiguous memory segments periodically or based on a size of the memory segment cache being above a threshold level.

Example 7 includes any example, comprising a central processing unit (CPU) to offload memory allocation to the work scheduler.

Example 8 includes any example, further comprising a server, data center, or rack.

Example 9 includes an apparatus comprising: a work scheduler circuitry comprising at least one processor and at least one work queue, the work scheduler is to: assign a workload to a processor and control when to fetch content relevant to the workload to store in a cache or memory accessible to the processor based on a position of an identifier of the workload in a work queue associated with the processor.

Example 10 includes any example, wherein the work scheduler is to pre-fetch content relevant to the workload by access to a look-up table to determine one or more memory locations of content associated with the workload.

Example 11 includes any example, wherein the content relevant to the workload includes one or more of: data, packet payload, packet context, connection context, a software environment, cryptographic keys, or instructions executed to process the data.

Example 12 includes any example, wherein the work scheduler is to update a position of an identifier of the workload in the work queue based on completion of another workload identified in the work queue.

Example 13 includes any example, wherein based on a position of the identifier of the workload being near or at a head of the work queue, the work scheduler is to cause a prefetch of the content relevant to the workload to store in the cache or memory accessible to the processor.

Example 14 includes any example, wherein a processor is to indicate which content in the cache or memory to not evict based at least in part on a position indicator for the identifier of the workload in the work queue.

Example 15 includes any example, wherein the processor is to prevent the content relevant to the workload from being evicted from the cache or memory based on the workload being near or at a head of the work queue.

Example 16 includes any example, and includes a central processing unit (CPU) to offload data processing scheduling to the work scheduler.

Example 17 includes any example, and includes a server, data center, or rack.

Example 18 includes a method comprising: allocating at least one entry in a queue of a queue management device, the at least one entry comprising a memory segment allocation from a memory segment cache or a page heap; and receiving, at the queue management device, a request to allocate a region of memory.

Example 19 includes any example, and includes based on at least one entry in the queue comprising a memory segment having a size that meets or exceeds a size of the region of memory, allocating the memory segment in response to the request to allocate a region of memory.

Example 20 includes any example, and includes dividing a first memory segment into smaller memory segments and providing entries in the queue associated with the smaller memory segments.

Example 21 includes any example, and includes combining contiguous memory segments into a second memory segment and providing an entry in the queue associated with the second memory segment.

Example 22 includes a method comprising: assigning, using a queue manager device, a workload to a processor; causing pre-fetch of content relevant to the workload to a memory accessible to the processor based on a position of an identifier of the workload in a work queue associated with the processor; and adjusting an ability to evict at least a portion of the content relevant to the workload from the memory based on a change in position of the identifier of the workload in the work queue.

Example 23 includes any example, wherein the content relevant to the workload includes one or more of: data, flow data, packet payload, packet context, connection context, a software environment, cryptographic keys, or instructions executed to process the data.

Example 24 includes any example, and includes: updating a position of the identifier of the workload in the work queue based on completion of another workload identified in the work queue.

Example 25 includes any example, and includes: reassigning the workload to another work queue based on load balancing of work among the processor and at least one other processor.

What is claimed is:

1. An apparatus comprising:
an interface;
circuitry, coupled to the interface, the circuitry comprising a processor, the circuitry to:
cause pre-fetch of packet data and content associated with a workload to be stored in a cache accessible to the processor core based on a position of an identifier of the workload in a work queue associated with the processor, wherein the pre-fetch of the packet data causes copying of the packet data into the cache before processing of the packet data by the workload, wherein the pre-fetch of the content causes copying of: a software environment to process the packet data, cryptographic keys used to process the packet data, and instructions executed to process the packet data, and wherein the packet data associated with the workload includes packet payload and packet connection context; and
a second circuitry to determine whether to permit eviction or not permit eviction of the pre-fetched packet data in the cache based at least in part on a position of the identifier of the workload in the work queue.

2. The apparatus of claim 1, wherein the circuitry is to pre-fetch the packet data associated with the workload by accessing a look-up table to determine one or more memory locations of packet data associated with the workload.

3. The apparatus of claim 1, wherein the circuitry is to update the position of the identifier of the workload in the work queue based on completion of another workload identified in the work queue.

4. The apparatus of claim 1, wherein based on the position of the identifier of the workload, the circuitry is to cause a pre-fetch of the packet data associated with the workload to store in the cache accessible to the processor core.

5. The apparatus of claim 1, wherein the second circuitry is to prevent the packet data associated with the workload from being evicted from the cache based on the position of the identifier of the workload within an offset from a head of the work queue.

6. The apparatus of claim 1, comprising a central processing unit (CPU) to offload data processing scheduling to the circuitry.

7. The apparatus of claim 1, further comprising a server, data center, or rack, wherein the server, data center, or rack comprises a central processing unit (CPU) to offload work scheduling to the circuitry.

8. The apparatus of claim 1, wherein the circuitry is to not cause pre-fetch of packet data that is stored in the cache.

9. The apparatus of claim 1, wherein the workload comprises a packet processing workload based on Network Function Virtualization (NFV), software-defined networking (SDN), or virtualized network function (VNF).

10. The apparatus of claim 1, wherein the packet data associated with the workload includes packet context comprising one or more of: Media Access Control (MAC) context information, Internet Protocol (IP) context information, or application context information.

11. The apparatus of claim 1, wherein the second circuitry is to assign a priority level to the packet data in the cache based on the position indicator, wherein a high priority level is associated with the position indicator associated with a head of the work queue and a low priority level is associated with the position indicator associated with a bottom of the work queue, and wherein permission to evict the packet data is inverse to the priority level.

12. A method comprising:
assigning, using an offload circuitry, a workload to a processor;
the offload circuitry causing pre-fetch of packet data and content associated with the workload to a memory accessible to the processor based on a position of an identifier of the workload in a work queue associated with the processor, wherein the pre-fetched packet data associated with the workload includes packet payload and packet connection context, and the pre-fetched content includes a software environment to process the packet data, cryptographic keys, and instructions executed to process the packet data; and adjusting an ability to evict at least a portion of the packet data associated with the workload from the memory, based on a change in the position of the identifier of the workload in the work queue, wherein the adjusting the ability to evict the at least a portion of the packet data associated with the workload comprises setting the ability to not evict based on the position of the identifier of the workload in the work queue being within an offset from a head of the work queue.

13. The method of claim 12, comprising:

updating the position of the identifier of the workload in the work queue based on completion of another workload identified in the work queue.

14. The method of claim 12, comprising:

reassigning the workload to another work queue based on load balancing of work among the processor and at least one other processor.

* * * * *